US012625219B2

(12) United States Patent
Wang et al.

(10) Patent No.: US 12,625,219 B2
(45) Date of Patent: May 12, 2026

(54) POSITIONING PROCESSING METHOD AND APPARATUS, AND DEVICE

(71) Applicant: VIVO MOBILE COMMUNICATION CO., LTD., Dongguan (CN)

(72) Inventors: Yuanyuan Wang, Dongguan (CN); Huaming Wu, Dongguan (CN); Ye Si, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 121 days.

(21) Appl. No.: 18/157,195

(22) Filed: Jan. 20, 2023

(65) Prior Publication Data

US 2023/0152412 A1 May 18, 2023

Related U.S. Application Data

(63) Continuation of application No. PCT/CN2021/108084, filed on Jul. 23, 2021.

(30) Foreign Application Priority Data

Jul. 24, 2020 (CN) ........................ 202010726019.X

(51) Int. Cl.
*G01S 5/00* (2006.01)
*H04L 5/00* (2006.01)
*H04W 64/00* (2009.01)

(52) U.S. Cl.
CPC .......... *G01S 5/0054* (2013.01); *H04L 5/0051* (2013.01); *H04W 64/00* (2013.01)

(58) Field of Classification Search
CPC .... G01S 5/0054; H04L 5/0051; H04W 64/00; H04W 4/02
See application file for complete search history.

(56) References Cited

U.S. PATENT DOCUMENTS 10,368,195 B2 * 7/2019 Tian ...................... H04W 8/005
2015/0296474 A1 10/2015 Cai et al.
2017/0111880 A1 4/2017 Park et al.
(Continued)

FOREIGN PATENT DOCUMENTS

CN 101895813 A 11/2010
CN 103476112 A 12/2013
(Continued)

OTHER PUBLICATIONS

China National Intellectual Property Administration, International Search Report issued in corresponding Application No. PCT/CN2021/108084, mailed Oct. 13, 2021.
(Continued)

*Primary Examiner* — Kabir A Timory
(74) *Attorney, Agent, or Firm* — The Webb Law Firm

(57) ABSTRACT

This application discloses a positioning processing method and apparatus, and a device, and relates to the field of communications technologies. The method is applied to a terminal, and includes: transmitting first signaling to a target cell, where the first signaling is used for activating or deactivating transmission of a positioning-related signal by the target cell of the terminal; and the target cell includes a serving cell and/or a neighboring cell of the terminal.

20 Claims, 9 Drawing Sheets

(56)                    References Cited

U.S. PATENT DOCUMENTS

| | | | |
|---|---|---|---|
| 2018/0159641 A1* | 6/2018 | Xu | H04W 4/12 |
| 2019/0166452 A1 | 5/2019 | Tenny | |
| 2020/0137715 A1 | 4/2020 | Edge et al. | |
| 2022/0116089 A1* | 4/2022 | Khoryaev | H04B 7/043 |
| 2022/0209927 A1* | 6/2022 | Shreevastav | H04L 5/0069 |
| 2023/0299917 A1* | 9/2023 | Ren | H04W 72/11 |

FOREIGN PATENT DOCUMENTS

| | | |
|---|---|---|
| CN | 107360617 A | 11/2017 |
| EP | 4195745 A1 | 6/2023 |
| EP | 4271067 A1 | 11/2023 |
| WO | 2018/094989 A1 | 5/2018 |

OTHER PUBLICATIONS

Qualcomm Incorporated, On Demand Transmission of PRS for NR, 3GPP TSG-RAN WG2 Meeting #104, R2-1817902, Spokane, USA, Nov. 12-16, 2018. See: ISR.
CMCC, "Discussion on DL PRS design", 3GPP TSG RAN WG1 #99, Reno, USA, Nov. 18-22, 2019, R1-1912548.

\* cited by examiner

Transmit first signaling to a target cell, where the first signaling is used for activating or deactivating transmission of a positioning-related signal by the target cell of the terminal; and the target cell includes a serving cell and/or a neighboring cell of the terminal

201

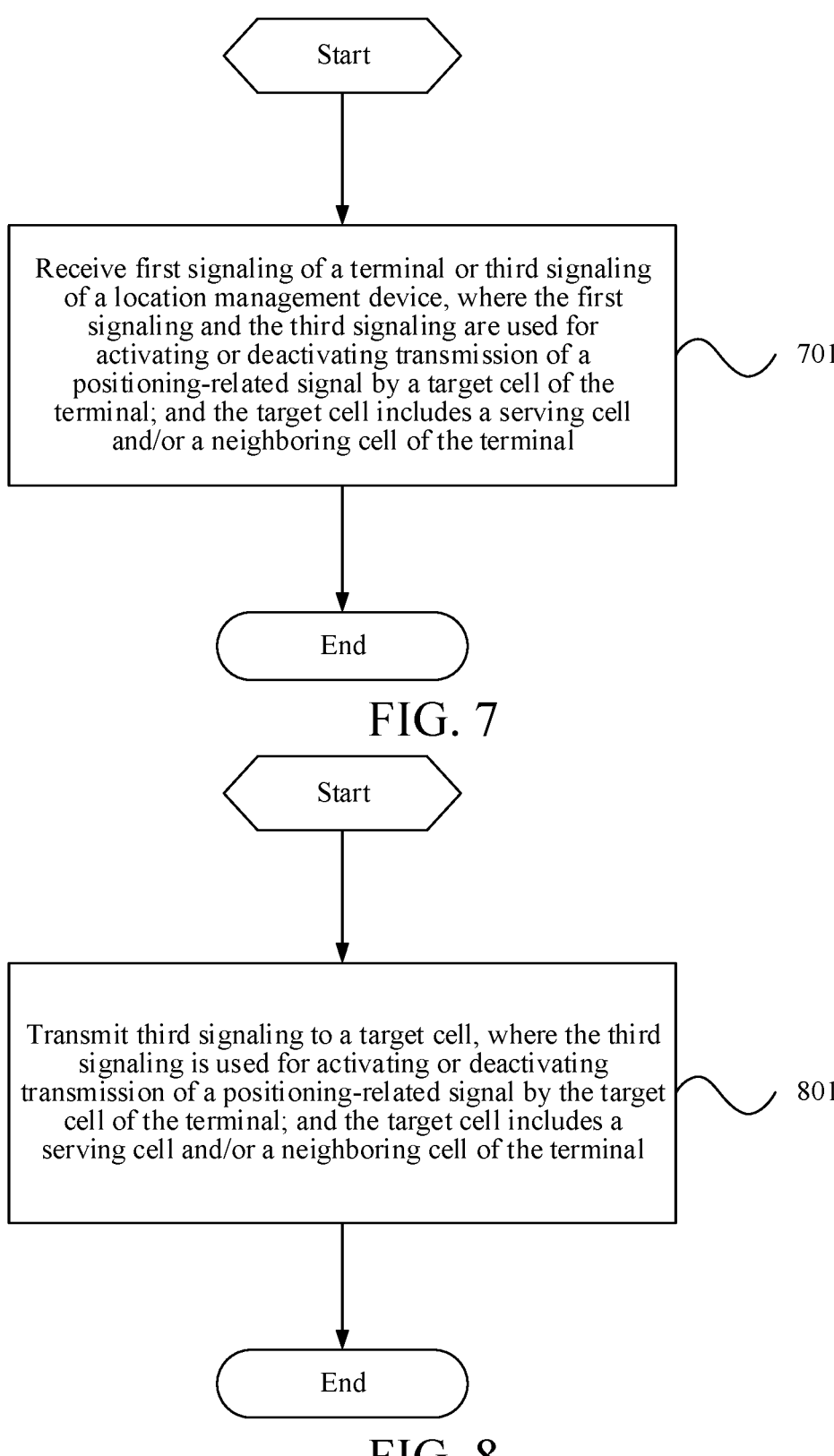

Start

Receive first signaling of a terminal or third signaling of a location management device, where the first signaling and the third signaling are used for activating or deactivating transmission of a positioning-related signal by a target cell of the terminal; and the target cell includes a serving cell and/or a neighboring cell of the terminal

701

End

FIG. 7

Start

Transmit third signaling to a target cell, where the third signaling is used for activating or deactivating transmission of a positioning-related signal by the target cell of the terminal; and the target cell includes a serving cell and/or a neighboring cell of the terminal

801

End

FIG. 8

First transmission module     910

First receiving module     1010

Second transmission module     1110

1200

Communication device

1201   Processor  ⟷  Memory   1202

POSITIONING PROCESSING METHOD AND APPARATUS, AND DEVICE

CROSS-REFERENCE TO RELATED APPLICATIONS

This application is a continuation of International Application No. PCT/CN2021/108084, filed on Jul. 23, 2021, which claims priority to Chinese Patent Application No. 202010726019.X, filed in China on Jul. 24, 2020, which are incorporated by reference in their entireties.

TECHNICAL FIELD

This application relates to the field of communications technologies, and specifically, to a positioning processing method and apparatus, and a device.

BACKGROUND

Currently, the positioning manner for a terminal needs to transparently transmit a to-be-transmitted positioning service request to a location management function (LMF) through an access and mobility management function (AMF) for processing.

However, due to the uncontrollability of a high-layer delay, when there is a positioning requirement, there is a situation in which a positioning reference signal cannot be triggered in time.

SUMMARY

According to a first aspect of this application, a positioning processing method, applied to a terminal, is provided, the method includes:

transmitting first signaling to a target cell, where
the first signaling is used for activating or deactivating transmission of a positioning-related signal by the target cell of the terminal; and the target cell includes a serving cell and/or a neighboring cell of the terminal.

According to a second aspect of this application provides a positioning processing method, applied to a network-side device, is provided, the method includes:

receiving first signaling of a terminal or third signaling of a location management device, where
the first signaling and the third signaling are used for activating or deactivating transmission of a positioning-related signal by a target cell of the terminal; and the target cell includes a serving cell and/or a neighboring cell of the terminal.

According to a third aspect of this application, a positioning processing method, applied to a location management device, is provided, the method includes:

transmitting third signaling to a target cell, where
the third signaling is used for activating or deactivating transmission of a positioning-related signal by the target cell of a terminal; and the target cell includes a serving cell and/or a neighboring cell of the terminal.

According to a fourth aspect of this application, a positioning processing apparatus is provided, which includes:

a first transmission module, configured to transmit first signaling to a target cell, where
the first signaling is used for activating or deactivating transmission of a positioning-related signal by the target cell of a terminal; and the target cell includes a serving cell and/or a neighboring cell of the terminal.

According to a fifth aspect of this application, a positioning processing apparatus is provided, which includes:

a first receiving module, configured to receive first signaling of a terminal or third signaling of a location management device, where
the first signaling and the third signaling are used for activating or deactivating transmission of a positioning-related signal by a target cell of the terminal; and the target cell includes a serving cell and/or a neighboring cell of the terminal.

According to a sixth aspect of this application, a positioning processing apparatus is provided, which includes:

a second transmission module, configured to transmit third signaling to a target cell, where
the third signaling is used for activating or deactivating transmission of a positioning-related signal by the target cell of a terminal; and the target cell includes a serving cell and/or a neighboring cell of the terminal.

According to a seventh aspect of this application, a communication device is provided. The communication device includes a processor, a memory, and a program or instruction stored in the memory and executable on the processor, the program or instruction, when executed by the processor, implementing the steps of the method according to the first aspect, or implementing the steps of the method according to the second aspect, or implementing the steps of the method according to the third aspect.

According to an eighth aspect of this application, a readable storage medium is provided. The readable storage medium stores a program or instruction, the program or instruction, when executed by a processor, implementing the steps of the method according to the first aspect, or implementing the steps of the method according to the second aspect, or implementing the steps of the method according to the third aspect.

According to a ninth aspect of this application, a chip is provided, which includes: a processor and a communication interface, where the communication interface is coupled to the processor, and the processor is configured to run a program or instruction, to implement the method according to the first aspect, or implement the method according to the second aspect, or implement the method according to the third aspect.

According to a tenth aspect of this application, a computer software product stored in a non-volatile storage medium is provided, where the software product is configured to be executed by at least one processor to implement the steps of the method according to the first aspect, or implement the steps of the method according to the second aspect, or implement the steps of the method according to the third aspect.

According to an eleventh aspect of this application, a communication device is provided, which is configured to perform the method according to the first aspect, or perform the method according to the second aspect, or perform the method according to the third aspect.

BRIEF DESCRIPTION OF THE DRAWINGS

FIG. 7 is a schematic flowchart of a positioning processing method applied to a network-side device according to an embodiment of this application;

FIG. 8 is a schematic flowchart of a positioning processing method applied to a location management device according to an embodiment of this application;

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application shall fall within the protection scope of this application.

The specification and claims of this application, and terms "first" and "second" are used to distinguish similar objects, but are unnecessarily used to describe a specific sequence or order. It should be understood that the data in such a way are interchangeable in proper circumstances, so that the embodiments of this application can be implemented in other orders than the order illustrated or described herein. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application are often used interchangeably, and the described technology can be used not only for the above systems and radio technologies, but also for other systems and radio technologies. However, the following description describes a new radio (New Radio, NR) system for example objectives, and NR terms are used in most of the description below, although these technologies are also applicable to applications other than NR system applications, such as a 6th generation (6G) communication system.

Figure 1:
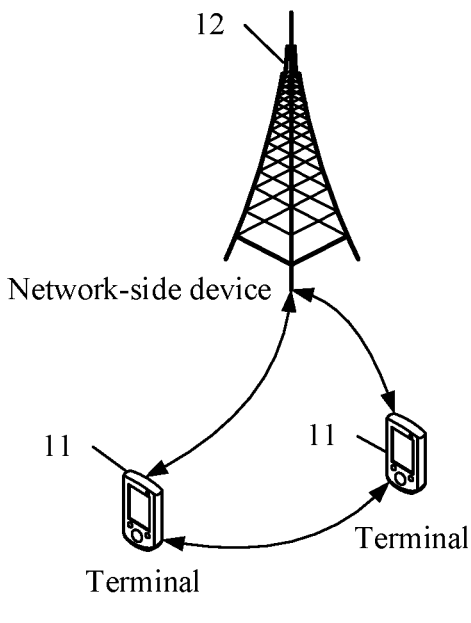
FIG. 1 is a block diagram of a wireless communication system.

FIG. 1 is a block diagram of a wireless communication system to which the embodiments of this application are applicable. The wireless communication system includes a terminal 11 and a network-side device 12. The terminal 11 may also be referred to as a terminal device or a user terminal (UE). The terminal 11 may be, for example, a terminal-side device such as a mobile phone, a tablet personal computer, a laptop computer, a personal digital assistant (PDA), a palmtop computer, a netbook, an ultra-mobile personal computer (UMPC), a mobile Internet device (MID), a wearable device (Wearable Device), an in-vehicle device (VUE), or a pedestrian terminal (PUE). The wearable device includes: a bracelet, earphones, glasses, or the like. It should be noted that, a specific type of the terminal 11 is not limited in the embodiments of this application. The network-side device 12 may be a base station or a core network, where the base station may be referred to as a Node B, an evolved node B (eNB), an access point, a base transceiver station (BTS), a radio base station, a radio transceiver, a basic service set (BSS), an extended service set (ESS), a home node B, a home evolved node B, a wireless local area network (WLAN) access point, a wireless fidelity (WiFi) node, a transmitting receiving point (TRP), or another appropriate term in the field, as long as the same technical effect is achieved. The base station is not limited to a specific technical term. It should be noted that, a base station in the NR system is used as an example in the embodiments of this application, but a specific type of the base station is not limited.

A positioning processing method provided in the embodiments of this application is described below through specific embodiments and application scenarios thereof with reference to the accompanying drawings.

A user device (UE) in the embodiments of this application may refer to an access terminal, a user unit, a user station, a mobile station, a mobile console, a remote station, a remote terminal, a mobile device, a user terminal, a terminal, a wireless communication device, a user agent, or a user apparatus. The terminal may also be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, or a wearable device.

Figures 2, 3:
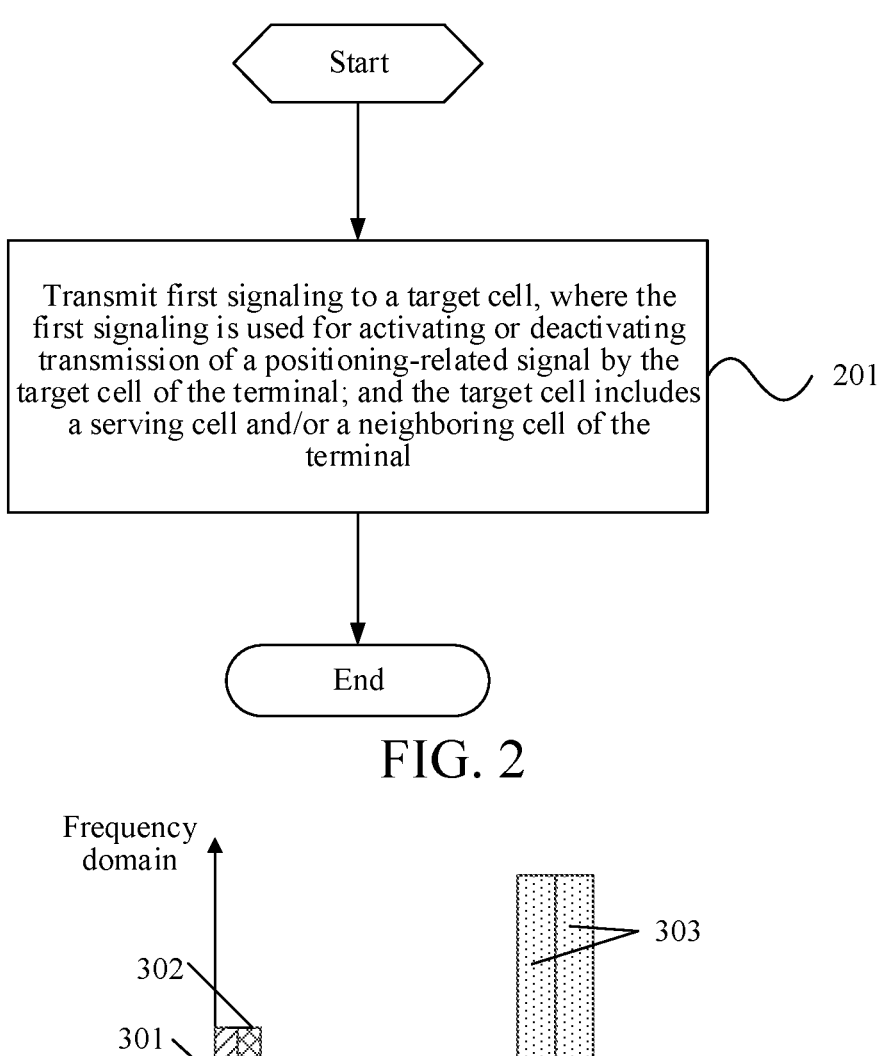
FIG. 2 is a schematic flowchart of a positioning processing method applied to a terminal according to an embodiment of this application.
FIG. 3 is a schematic diagram of a location relationship between first signaling and a positioning-related signal.

As shown in FIG. 2, a positioning processing method in this embodiment of this application is applied to a terminal, and includes the following steps.

Step 201. Transmit first signaling to a target cell, where the first signaling is used for activating or deactivating transmission of a positioning-related signal by the target cell of the terminal; and the target cell includes a serving cell and/or a neighboring cell of the terminal.

In this way, according to step 201, the terminal can transmit the first signaling to the target cell, namely, the serving cell and/or the neighboring cell of the terminal, to directly activate or deactivate the transmission of the positioning-related signal by the target cell, so as to reduce delays of positioning, thereby meeting the timeliness requirement for obtaining a positioning reference signal.

Therefore, for a scenario with a positioning requirement, the terminal to which the method in this embodiment of this application is applied transmits the first signaling to the serving cell and/or the neighboring cell of the terminal, so that the transmission of the positioning-related signal by the serving cell and/or the neighboring cell can be activated, thereby obtaining the positioning reference signal in time; and for a scenario without the positioning requirement, the first signaling is transmitted to the serving cell and/or neighboring cell of the terminal, so that the transmission of the positioning-related signal by the serving cell and/or the neighboring cell can be deactivated, thereby avoiding consumption of signaling resources.

It should be known that, the target cell is a cell of a network-side device (such as a base station, a transmission reference point (TRP), a reference point (RP), or a radio head).

Optionally, in this embodiment, the positioning-related signal includes at least one of the following:

second signaling, where the second signaling is used for activating or deactivating transmission of a positioning reference signal by the neighboring cell, or activating or deactivating receiving of the positioning reference signal by the terminal; or a positioning reference signal.

Herein, the second signaling is signaling transmitted by a specific cell (such as a cell for positioning control) for activating or deactivating the transmission of the positioning reference signal by the target cell after receiving the first signaling. Alternatively, the specific cell may transmit the second signaling to the target cell of the terminal. Alternatively, the specific cell may also transmit the second signaling to a location management device such as an LMF, and activate or deactivate the transmission of the positioning reference signal by the target cell by using the location management device. The LMF may further activate or deactivate the transmission of the positioning reference signal by the target cell through signaling, and the signaling may use a design the same as that of the first signaling.

Alternatively, the specific cell transmits the second signaling to the terminal, and activates or deactivates the receiving of the positioning reference signal by the terminal.

In an example, in a case that the target cell is the serving cell and the neighboring cell or the target cell is the neighboring cell, the first signaling is used for activating or deactivating the transmission of the positioning reference signal by the target cell; and in a case that the target cell is the serving cell, the first signaling is used for activating or deactivating the transmission of the second signaling and the positioning reference signal by the target cell.

Optionally, the positioning reference signal includes at least one of the following:

an on demand positioning reference signal PRS;
an aperiodic positioning reference signal PRS;
a periodic positioning reference signal PRS;
a cell reference signal CRS;
a channel state information reference signal CSI-RS;
a synchronization signal block SSB; or
a tracking reference signal TRS.

Herein, the on demand (on demand) positioning reference signal (PRS) is dynamically or semi-statically configured. In an embodiment, the on demand positioning reference signal PRS may be understood as PRS configuration configured or activated according to a demand of the terminal or a service, where the PRS may be periodic, semi-static, or aperiodic; and a manner of the activation or configuration thereof may also be statically, semi-statically, or dynamically configured. Certainly, the positioning reference signal includes, but is not limited to: the on demand PRS, the aperiodic PRS, the periodic PRS, the cell reference signal (CRS), the channel state information reference signal (CSI-RS), the synchronization signal block (SSB), and the tracking reference signal (TRS).

It can be learned from the above that, the positioning-related signal may be the second signaling and/or the positioning reference signal. Therefore, optionally, the positioning-related signal transmitted by the target cell includes at least one of the following:

determining a to-be-transmitted positioning-related signal;
determining a to-be-transmitted positioning reference signal; or
determining to-be-transmitted second signaling.

That is, in a case that the first signaling is received, the target cell performs at least one of determining the to-be-transmitted positioning-related signal, determining the to-be-transmitted positioning reference signal, or determining the to-be-transmitted second signaling, and then transmits according to the determined content.

Determining the to-be-transmitted positioning-related signal refers to determining whether the target cell currently transmits the second signaling, or transmits the positioning reference signal, or transmits both. Determining the to-be-transmitted positioning reference signal refers to determining which positioning reference signal the target cell transmits, how to transmit, and the like, and may also refer to determining to transmit configuration information of the positioning reference signal. Determining the to-be-transmitted second signaling refers to determining which second signaling the target cell transmits, how to transmit the second signaling, a relationship between the second signaling and the positioning reference signal, and the like, and may also refer to determining to transmit configuration information of the second signaling.

Optionally, the determining a to-be-transmitted positioning reference signal includes determining at least one of the following:

an identifier (ID) or group ID of the positioning reference signal;
a transmission time of the positioning reference signal;
a transmission period of the positioning reference signal;
a quantity of transmission times of the positioning reference signal;
a time frequency resource of the positioning reference signal;
a quantity of the positioning reference signal;
a spatial relation of the positioning reference signal;
power information of the positioning reference signal; or
transmitting or stopping transmitting the positioning reference signal.

The time frequency resource includes, but is not limited to: a quantity of symbols, a time offset, frequency domain information (such as a frequency domain reference point pointA, a bandwidth (BW), a comb structure comb, a frequency domain offset, frequency hopping information, and the like). The quantity of the to-be-transmitted positioning reference signal may be a quantity of resources, or a quantity of resource sets (resource set).

Optionally, in this embodiment, the to-be-transmitted positioning reference signal is determined according to at least one of the following:

pre-configured configuration information of the positioning reference signal;
pre-defined configuration information of the positioning reference signal;
dynamically scheduled configuration information of the positioning reference signal; or
the first signaling.

Herein, the first signaling indicates the to-be-transmitted positioning reference signal by carrying the configuration information of the positioning reference signal or through a correspondence with the configuration information of the positioning reference signal. In this way, the target cell may directly transmit the positioning reference signal based on the pre-configured configuration information of the positioning reference signal, may directly transmit the positioning reference signal based on the pre-defined configuration information of the positioning reference signal, may directly transmit the positioning reference signal based on the dynamically scheduled configuration information of the positioning reference signal, and may directly transmit the positioning reference signal based on the first signaling. Certainly, configuration information of the to-be-transmitted positioning reference signal may also be determined through at least two of the pre-configured configuration information of the positioning reference signal, the pre-defined configuration information of the positioning reference signal, the dynamically scheduled configuration information of the positioning reference signal, or the first signaling, so as to complete the transmission of the positioning reference signal.

Example 1. The target cell transmits the positioning reference signal according to the configuration information (such as the transmission time, the transmission period, the quantity of transmission times, the quantity, the spatial relation, the time frequency resource, or the power information) of the positioning reference signal pre-configured by the LMF or the network-side device.

Example 2. A network side configures N1 positioning reference signals (such as aperiodic or on demand PRSs), and then may determine to transmit M1 aperiodic PRS(s) in the N1 aperiodic PRSs with reference to the first signaling, where M1 is an integer, and 1≤M1≤N1. Certainly, what is also determined may also include at least one of the transmission time, the transmission period, the quantity of transmission times, the time frequency resource, or the power information.

Example 3. A network side configures N2 positioning reference signals (such as aperiodic or on demand PRSs), and then may determine to transmit M2 aperiodic PRS(s) in the N2 aperiodic PRSs with reference to the first signaling and the configuration information of the positioning reference signal pre-defined by the network side or the configuration information of the positioning reference signal pre-configured by the LMF, where M2 is an integer, and 1≤M2≤N2. Certainly, what is also determined may also include at least one of the transmission time, the transmission period, the quantity of transmission times, the time frequency resource, or the power information.

Optionally, the first signaling includes at least one of the following:

a physical random access channel PRACH signal;

a sounding reference signal SRS;

uplink control information UCI;

a target signal whose signal feature meets a second preset condition; or a first target uplink resource.

Certainly, the first signaling includes, but is not limited to: the physical random access channel (PRACH) signal, the channel sounding reference signal (SRS), the uplink control information (UCI), the target signal whose signal feature meets the second preset condition, and the first target uplink resource.

In this way, if the PRACH signal being the first signaling is used as an example, in the example 2 of determining the to-be-transmitted positioning reference signal, at least one of the following may be performed:

a1) determining a corresponding positioning reference signal (such as an aperiodic or on demand PRS) according to correspondences between root sequences of different PRACHs and positioning reference signals (such as aperiodic or on demand PRSs);

b1) determining a corresponding positioning reference signal (such as an aperiodic or on demand PRS) according to a RO (PRACH Occasion) resource in a current PRACH sequence; or c1) determining a corresponding positioning reference signal (such as an aperiodic or on demand PRS) according to uplink information carried by a RO resource.

Herein, if a corresponding positioning reference signal (such as an aperiodic or on demand PRS) is jointly determined according to a1) and b1), for example: an index of a first positioning reference signal (such as an aperiodic or on demand PRS) is determined according to a1), and a target transmission occasion of the positioning reference signal (such as the aperiodic or on demand PRS) is determined according to b1), the target cell may transmit the first PRS at the target transmission occasion.

In the example 3 of determining the to-be-transmitted positioning reference signal, at least one of the following may be performed:

a2) determining, in a current PRACH sequence, a specific preamble (preamble) sequence (for example, being generated according to a specific root sequence, or specific preambles (that is, few preambles in 64 preambles) for activating the transmission of the positioning reference signal (such as the aperiodic or on demand PRS);

b2) determining, in a current PRACH sequence, a specific resource (such as a predetermined random access occasion RO resource for transmitting a target random access preamble sequence) for activating the transmission of the positioning reference signal (such as the aperiodic or on demand PRS), where the predetermined RO resource is dynamically configured in the configuration information transmitted by the network side, or pre-defined; or c2) determining a corresponding positioning reference signal (such as an aperiodic or on demand PRS) according to uplink information carried by a RO resource.

Herein, if a corresponding positioning reference signal (such as an aperiodic or on demand PRS) is jointly determined according to a2) and b2), for example: an index of a second positioning reference signal (such as an aperiodic or on demand PRS) is determined according to a2), and a target transmission occasion of the positioning reference signal (such as the aperiodic or on demand PRS) is determined according to b2), the target cell may transmit the second positioning reference signal (such as the aperiodic or on demand PRS) at the target transmission occasion.

The target transmission occasion of the first positioning reference signal or the second positioning reference signal may be determined according to an activation time T1 and a time offset T2, for example, the target transmission occasion (the transmission time) is T1+T2. Herein, T2 may be a fixed value that is configured based on a capability of the terminal, configured based on a capability of the network side, or predefined; and may also be a variable, for example, T2 changes according to configuration of the first signaling (such as the resource or the root sequence). In this embodiment, the transmission occasion is not limited to the transmission time, and also includes the quantity of transmission times, the transmission period, and the like.

Certainly, the implementation of the PRACH signal being used as the first signaling is also applicable to the SRS, the UCI, the target signal whose signal feature meets the second preset condition, and the first target uplink resource. Details are not described herein again.

In this embodiment, in addition to being directly used as the first signaling, the first target uplink resource may be used for determining the to-be-transmitted positioning reference signal in consideration of configuration information of the first signaling. Optionally, the first signaling may be used as the first signaling by the first target uplink resource carrying the configuration information of the first signaling and with reference to the first target uplink resource and at least one of the PRACH signal, the SRS, the UCI, or the target signal whose signal feature meets the second preset condition. For example, the first signaling includes the PRACH signal and the first target uplink resource carrying configuration information of the PRACH signal for implementation.

In this embodiment, optionally, the PRACH signal includes one or more PRACH signals;

a preamble sequence of the PRACH signal is preset;

a transmission resource of the PRACH signal is preset;

there is a correspondence between the PRACH signal and the positioning-related signal;

the PRACH signal is a PRACH signal of the target cell;

the PRACH signal is determined according to monitoring the target cell and/or configuration of the target cell;

there is a correspondence between configuration information of the PRACH signal and the positioning-related signal; or there is a correspondence between a transmission resource of the PRACH signal and the positioning-related signal.

Herein, for the PRACH signal used as the first signaling, if a current target cell is a plurality of cells, in a case that random access channel (RACH) resources or configuration information of the plurality of cells are consistent, one preamble sequence and a same resource are used as the first signaling to be transmitted to the plurality of cells, that is, the first signaling corresponding to the plurality of cells is the same; in a case that the plurality of cells have overlapping RACH resources, one preamble sequence and a same resource are similarly used as the first signaling to be transmitted to the plurality of cells, that is, the first signaling corresponding to the plurality of cells is the same; and in a case that a RACH resource or configuration of a cell in the plurality of cells is different from those of other cells, for the cell different from other cells, a single preamble sequence is used as the first signaling to be transmitted to the cell. The preamble sequence may be pre-determined (pre-defined) for activating or deactivating the positioning-related signal, for example, may be a dedicated preamble sequence.

To transmit the PRACH signal to the plurality of cells, the UE needs to obtain configuration information of PRACH signals of the plurality of cells, where the configuration information is optionally transmitted by the serving cell or obtained by monitoring of the UE.

The SRS in this embodiment includes an SRS used for measuring and/or positioning. Optionally, the SRS meets at least one of the following:

a base sequence of the SRS is generated according to a preset identifier, where the preset identifier includes a cell ID, a public ID, or a positioning ID;

a sequence of the SRS is preset;

the SRS has at least one symbol for activating or deactivating the transmission of the positioning-related signal;

the SRS carries indication information for activating or deactivating;

there is a correspondence between the SRS and the positioning-related signal;

a transmission resource of the SRS is preset or dynamically scheduled;

there is a correspondence between a transmission resource of the SRS and the positioning-related signal;

configuration information of the SRS is preset or dynamically scheduled; or there is a correspondence between configuration information of the SRS and the positioning-related signal.

The at least one symbol for activating or deactivating the transmission of the positioning-related signal in the SRS may be a specific symbol (such as a first symbol, or a plurality of continuous or discontinuous symbols). For the SRS carrying the indication information for activating or deactivating, the indication information may be an identification identifier and/or 1-bit information, so that the neighboring cell does not need blind detection, or reduces blind detection. The transmission resource of the SRS may be N3 symbols that are preset or dynamically scheduled. The configuration information of the SRS may be N4 symbols that are preset or dynamically scheduled, where the configuration information may also be information for performing key protection or scrambling on an identification identifier or other security identifiers. For the SRS that has the correspondence with the positioning-related signal, the correspondence may indicate, but is not limited to, an offset between the positioning-related signal and the SRS. The offset is X symbol(s) or Y slot(s) (slot), and certainly, the offset may also be X+Y*14 symbols. Similarly, for the SRS whose transmission resource or configuration information has the correspondence with the positioning-related signal, the correspondence may also indicate, but is not limited to, an offset between the two.

Further, when the SRS is used for activating or deactivating the transmission of the positioning-related signal, the SRS may also include a sequence identifier of the UE carried by the specific symbol (such as the first symbol, or the plurality of continuous or discontinuous symbols).

In this embodiment, optionally, the UCI meets at least one of the following:

the UCI carries indication information for activating or deactivating;

the UCI carries configuration information of the positioning-related signal; or a signaling format of the UCI is related to carried information.

For the UCI carrying the indication information for activating or deactivating, the indication information may be an identification identifier (such as an identifier of the UE or the positioning reference signal that needs to be activated) and/or 1-bit information. For the UCI whose signaling format is related to the carried information, Alternatively, the signaling format may be similar to a format (format) 0 or 1 of a physical uplink control channel (PUCCH), and only includes distinguishing of activation or deactivation; and may be similar to a PUCCH format 2 or 3, and includes specific information of the positioning-related signal for activating or deactivating.

In this embodiment, for the target signal used as the first signaling and whose signal feature meets the second preset condition, optionally, the target signal meets at least one of the following:

the target signal is a pseudorandom code sequence;

the target signal is a ZC sequence;

an initial seed Cinit of the target signal is associated with preset information;

there is a correspondence between the target signal and the positioning-related signal;

a transmission resource of the target signal is preset or dynamically scheduled;

a transmission resource of the target signal belongs to a target resource set;

sequence information or cyclic shifting of the target signal is associated with preset information;

configuration information of the target signal is preset or dynamically scheduled;

there is a correspondence between configuration information of the target signal and the positioning-related signal; or there is a correspondence between a transmission resource of the target signal and the positioning-related signal.

The preset information includes at least one of the following:

a cell ID or group ID;

an ID of the target signal;

an ID or group ID of the positioning-related signal;

a symbol of the target signal;

a slot of the target signal;

a symbol of the positioning-related signal; or a slot of the positioning-related signal.

The target resource set includes at least one of the following:

a resource set pre-configured by a network-side device;

a resource set pre-defined by a protocol;

a resource set capable of being preempted by the target signal; or a dynamically scheduled resource set.

The target resource set meets at least one of the following:

a bandwidth of the target resource is fixed or corresponds to a bandwidth part (bandwidth part, BWP);

a center frequency of the target resource is fixed or corresponds to a BWP;

a comb structure Comb of the target resource is fixed or meets a third preset condition;

a frequency domain offset of the target resource is fixed or meets a fourth preset condition; or a time domain location of the target resource is fixed or corresponds to a candidate resource.

In this way, the first signaling may use a specific radio information management (RIM) signal. If the time domain location of the transmission resource of the target signal is fixed, the time domain location may be a boundary slot of time division duplexing (TDD), and the candidate resource is a resource scheduled for the terminal. Both the third preset condition and the fourth preset condition are that the Comb is consistent with the frequency domain offset. Certainly, the third preset condition and the fourth preset condition may also be other settings.

Alternatively, for the target signal being the Zadoff-Chu (ZC) sequence, ZC cyclic shifting indicates whether to activate, or which positioning-related signal is activated.

In this embodiment, optionally, the second signaling includes at least one of the following:

a target signal whose signal feature meets a first preset condition;

Xn interface information;

downlink control information (DCI);

a target downlink resource; or

Long Term Evolution Positioning Protocol A LPPa or New Radio Positioning Protocol A NRPPa information.

Herein, the second signaling may be transmitted by the serving cell to the neighboring cell, or be transmitted by the serving cell to the location management device such as the LMF. Moreover, the second signaling is used for activating or deactivating the receiving of the positioning reference signal by the terminal, and may also be transmitted by the serving cell to the terminal. Therefore, the implementation of the second signaling includes, but is not limited to, at least one of the target signal whose signal feature meets the first preset condition, the Xn interface information, the DCI, the target downlink resource, or the LPPa or NRPPa information. Certainly, the LMF may also transmit signaling to activate or deactivate the receiving of the positioning reference signal by the terminal.

The target signal that may be used as the second signaling may be the same as the above target signal used as the first signaling, that is, the first preset condition is the same as the second preset condition. In this way, the limitation on the target signal used as the first signaling is also applicable to the target signal used as the second signaling. However, for the target signal used as the second signaling, if there is the correspondence between the target signal and the positioning-related signal, there is the correspondence between the configuration information of the target signal and the positioning-related signal, there is the correspondence between the transmission resource of the target signal and the positioning-related signal, or there is a limitation related to the positioning-related signal, the positioning-related signal is the positioning reference signal. For the target signal used as the second signaling, the candidate resource is a resource scheduled for the neighboring cell.

In addition, the target signal used as the second signaling and whose signal feature meets the first preset condition may also include, but is not limited to: at least one of a larger delay, a larger path loss, being different from a signal currently measured by the terminal, and carrying identification information of a transmitting cell, or a quantity of detectable second signaling within a preset time. In consideration of a distance of the neighboring cell, the target signal needs a larger delay, such as transmitting two continuous symbols, using an extended cyclic prefix (CP), or using a smaller subcarrier spacing. Transmitting two continuous symbols may refer to aggregating CPs of the two symbols to a first symbol, or may also mean that phases between the symbols are continuous. In consideration of the distance of the neighboring cell, the target signal needs a larger path loss. The target signal is different from the signal currently measured by the terminal, and may be designed according to configuration and a sequence of the signal. The identification information of the transmitting cell carried by the target signal may be identification information (such as a group ID) of a group, that is, group IDs carried by second signaling in a specific area are the same. Herein, the group ID may be indicated or pre-defined by the LMF and constrained by an area ID or areascop. Further, one serving cell may also have i group IDs, and i is optionally 1, 2, 4, 8, or 16, and an upper limit thereof is optionally 128, 256, 1024, 4096, or 65536. The identification information of the transmitting cell carried by the target signal includes: time division, that is, dividing different cells according to different time domain locations; frequency division, that is, dividing different cells according to different frequency domain locations; and code division, that is, dividing different cells according to different RS sequences.

In this embodiment, optionally, the first target uplink resource meets at least one of the following:

the first target uplink resource carries configuration information of the positioning-related signal;

information carried by the first target uplink resource is capable of being parsed by a physical layer;

there is a correspondence between configuration information of the first target uplink resource and the positioning-related signal;

there is a correspondence between a transmission resource of the first target uplink resource and the positioning-related signal; or there is a correspondence between the first target uplink resource and a transmission time of the positioning-related signal.

Herein, the first target uplink resource may be individually used as the first signaling; and may also be a specific uplink resource matching a signal of the first signaling, to transmit or receive the signal of the first signaling and/or the configuration information of the positioning-related signal. Because the information carried by the first target uplink resource may be parsed, the positioning reference signal that needs to be transmitted is optionally determined with reference to the information carried by the first target uplink resource and an identifier of a receiving cell (or the pre-configured information of the positioning reference signal), and certainly, values of X and Y may also be determined.

As shown in FIG. 3, the first signaling includes a signal sequence 301 and a first target uplink resource 302 carrying the configuration information of the positioning-related signal, and activates transmission of a positioning-related signal 303 by the target cell after X+Y*14 symbols. A time between the first signaling and the positioning-related signal may use a symbol as a unit, or may also use a slot or the like.

The configuration information of the positioning reference signal includes, but is not limited to: a frequency layer ID, a pointA, a subcarrier spacing (SCS), a comb size, starting location information of the positioning reference signal, bandwidth information of the positioning reference signal, numerology (numerology) information of the positioning reference signal, a frequency band (band) identifier, and time domain information of the positioning reference signal. The time domain information includes, but is not limited to: a time domain location, a period, a periodic offset, a transmission occasion, and repeated information.

If the first signaling is like an SSB (further carrying physical broadcast channel (PBCH) information in addition to a primary synchronization signal (PSS) and a secondary synchronization signal (SSS)), the first signaling may use at least one symbol for activating or deactivating the transmission of the positioning-related signal and/or carry indication information (such as an identification identifier, and 1-bit information) for activating or deactivating. There are N5 symbols for the transmission of the signal and N6 symbols for carrying configuration information in the first signaling. The configuration information may be information for performing key protection or scrambling on an identification identifier or other security identifiers.

In this embodiment, activating or deactivating transmission of an identification identifier or a security key of the positioning-related signal may be configured by the network-side device or the location management device such as the LMF. The neighboring cell may be pre-configured from the network side, or pre-configured through network deployment, or combinedly configured.

In addition, in this embodiment, the implementation of the first target uplink resource is also applicable to a target downlink resource. Details are not described herein again.

In addition, optionally, the method further includes:

transmitting the configuration information of the positioning-related signal through a second target uplink resource.

Herein, the second target uplink resource is a resource dedicatedly used for transmitting the configuration information of the positioning-related signal.

In this embodiment, the configuration information of the first signaling may be configured by the network-side device or the LMF. Therefore, optionally, the method further includes:

receiving configuration information of the first signaling transmitted by a location management device or a network-side device, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Herein, it may be learned from the above that, the type of the first signaling may include the PRACH signal, a signal dedicatedly used for activating or deactivating (such as the SRS or the target signal), or other uplink signals (the UCI and a signal of the first target uplink resource). The correspondence with the positioning-related signal may be that: the first signaling activates or deactivates all specific positioning-related signals respectively corresponding to the first signaling.

Certainly, configuration information corresponding to the second signaling, the PRACH signal, the SRS, the UCI, the first target uplink resource, and the like may be similar to that of the above first signaling. Details are not described herein again.

It should be noted that, the first signaling and the second signaling may determine the to-be-transmitted positioning-related signal with reference to the second target uplink resource and/or the first target uplink resource, and the second signaling may also determine the to-be-transmitted positioning-related signal with reference to the second target uplink resource and/or the target downlink resource.

In this embodiment, for the transmission occasion of the positioning reference signal and the signaling used for activating or deactivating (such as the first signaling or the second signaling), the signaling used for activating or deactivating may also be used for information exchange (such as: successfully activating).

Optionally, the target cell feeds back for the first signaling after receiving the first signaling. Therefore, after the transmitting first signaling to a target cell, the method further includes:

receiving first feedback information of the target cell, where the first feedback information is used for indicating at least one of the following:

whether the transmission of the positioning-related signal is successfully activated or deactivated; or whether the first signaling is successfully received.

The first feedback information received by the terminal indicates whether the transmission of the positioning-related signal is successfully activated or deactivated and/or whether the first signaling is successfully received.

The first feedback information may be interacted through UU signaling, such as transmitted in a random access response (RAR), and the above indication is performed through information of one or more bits of the RAR. The information may use uplink grant UL grant, a cell-radio network temporary identifier (C-RNTI) (all 0 or all 1), or the like. In another example, the first feedback information is a random access preamble identifier (RAPID), which is a preamble index obtained when a gNB detects a preamble. If the terminal discovers that the RAPID received by the terminal is the same as an index used when the terminal transmits a preamble (if the preamble is specified by positioning, it is considered that an on demand PRS is successfully activated), it is considered that a corresponding RAR is successfully received, and a corresponding RAPID medium access control (MAC) subheader is formed by three fields (E/T/RAPID).

The first feedback information may also detect the received positioning-related signal to determine whether to activate or deactivate the estimated positioning-related signal.

However, it may be learned from the above embodiments that, the serving cell may transmit the second signaling to the neighboring cell, and then the neighboring cell may feed back information to the serving cell, such as perform X2 signaling interaction, or transmit signaling to the LMF. The LMF collects feedback information of all related neighboring cells, and transmits neighboring cells that perform determining acknowledgement (ACK) or neighboring cells that perform negative acknowledgement (NACK) to the serving cell. In this case, the feedback information of the neighboring cell also indicates whether the transmission of the positioning reference signal is successfully activated or deactivated and/or whether the second signaling is successfully received. In addition, the feedback information of the neighboring cell may implement the above first feedback information. Details are not described herein again.

In addition, the cell that receives the first signaling and/or the second signaling may also feed back to the LMF that: the cell notifies the LMF that the cell activates or deactivates the corresponding signal through single signaling exchange. When the cell performs other signaling interaction, the cell carries feedback information of the cell to the LMF, to notify the cell to activate or deactivate the corresponding signal. Alternatively, an activated or deactivated signal ID, an activated or deactivated source device, or the like may be fed back.

In this embodiment, optionally, the target cell is determined in at least one of the following manners:

configuration of a network side;

a monitoring result of the terminal; or a measurement result of radio resource management (Radio Resource Management, RRM).

In addition, for the target cell, in addition to activating or deactivating the transmission of the positioning-related signal by the target cell through the first signaling of the terminal, the transmission of the positioning-related signal by the target cell may also be activated or deactivated through third signaling of the LMF. Therefore, after receiving the third signaling of the LMF, the transmission of the positioning-related signal by the target cell is activated or deactivated.

Same as the first signaling, in a case that the target cell is the serving cell and the neighboring cell or the target cell is the neighboring cell, the third signaling is used for activating or deactivating the transmission of the positioning reference signal by the target cell; and in a case that the target cell is the serving cell, the third signaling is used for activating or deactivating the transmission of the second signaling and the positioning reference signal by the target cell.

Moreover, the target cell receives configuration information of the third signaling transmitted by the LMF; or, transmits the configuration information of the third signaling to the LMF. The configuration information of the third signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the third signaling; or a correspondence with the positioning-related signal.

In this way, the configuration information of the third signaling is similar to the configuration information of the first signaling. Details are not described herein again.

Optionally, the third signaling includes:

NRPPa information.

The cell that receives the third signaling may also feed back information to the LMF that: the cell notifies the LMF that the cell activates or deactivates the corresponding signal through single signaling exchange. When the cell performs other signaling interaction, the cell carries feedback information of the cell to the LMF, to notify the cell to activate or deactivate the corresponding signal. Alternatively, an activated or deactivated signal ID, an activated or deactivated source device, or the like may be fed back.

In this embodiment, the terminal can activate the positioning reference signal transmitted by the serving cell and the positioning reference signal transmitted by the neighboring cell based on the first signaling or the third signaling, to perform positioning measurement, so as to obtain positioning information.

Application (using activating a PRS as an example) of the method in the embodiments of this application in different scenarios is described below with reference to the accompanying drawings.

Figure 4:
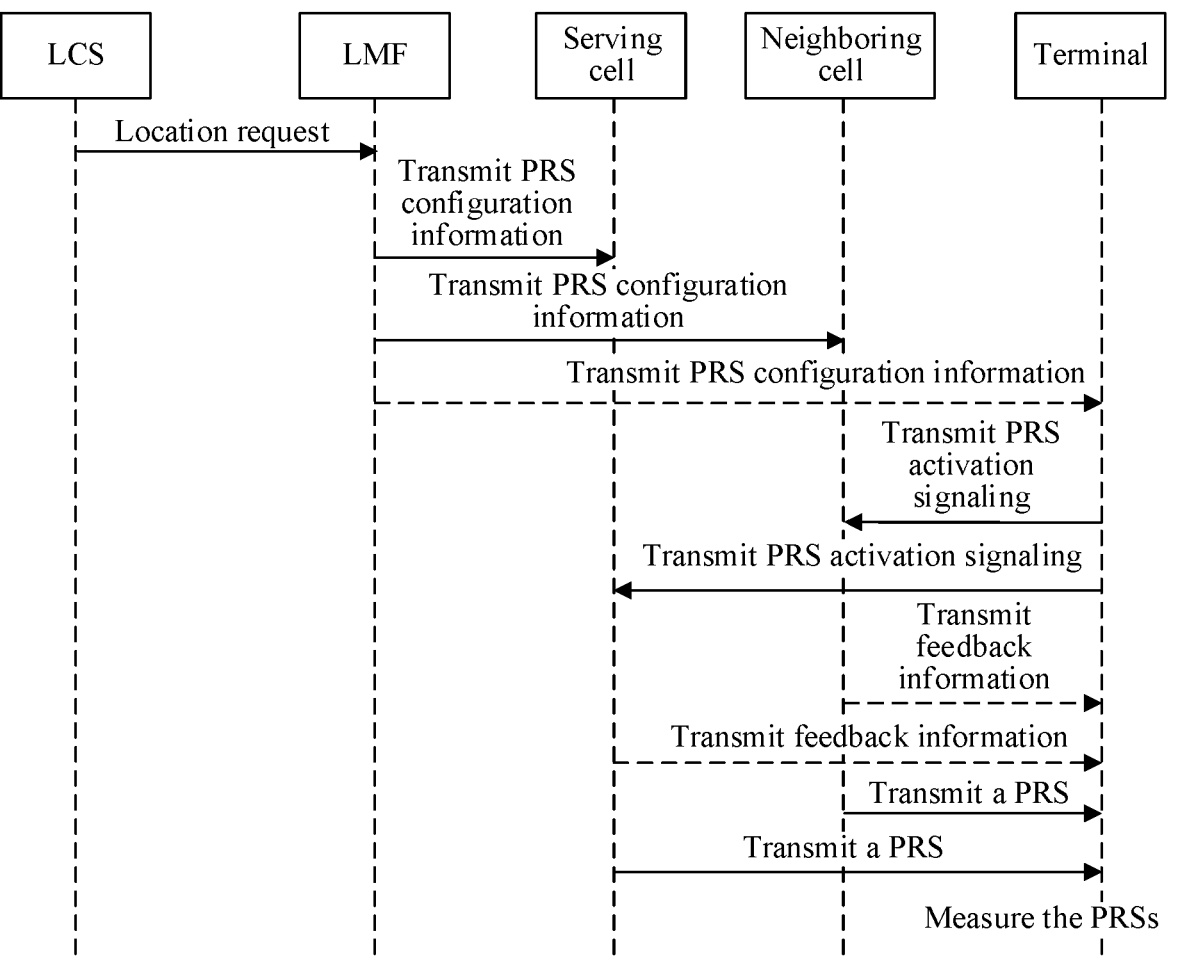
FIG. 4 is a schematic flowchart of a scenario 1.

Scenario 1. As shown in FIG. 4, a location server (Location Based Services, LBS) transmits a location request including a delay and a precision threshold to an LMF. Herein, the LMF configures PRS configuration information, and transmits the PRS configuration information to a serving cell and a neighboring cell for subsequent transmission of PRSs. The LMF may also transmit PRS configuration information to a terminal, for the terminal to subsequently measure the PRSs. The terminal transmits PRS activation signaling (namely, first signaling) to the serving cell and the neighboring cell, to activate transmission of PRSs by the serving cell and the neighboring cell. In this way, the terminal can measure the PRSs of the serving cell and the neighboring cell, so as to complete positioning.

The serving cell and the neighboring cell can also transmit feedback information to the terminal after receiving the PRS activation signaling, to indicate an activation situation and other information.

The LMF can also include PRS configuration information of PRS activation signaling (namely, third signaling), to activate the transmission of the PRSs by the serving cell and the neighboring cell.

Figure 5:
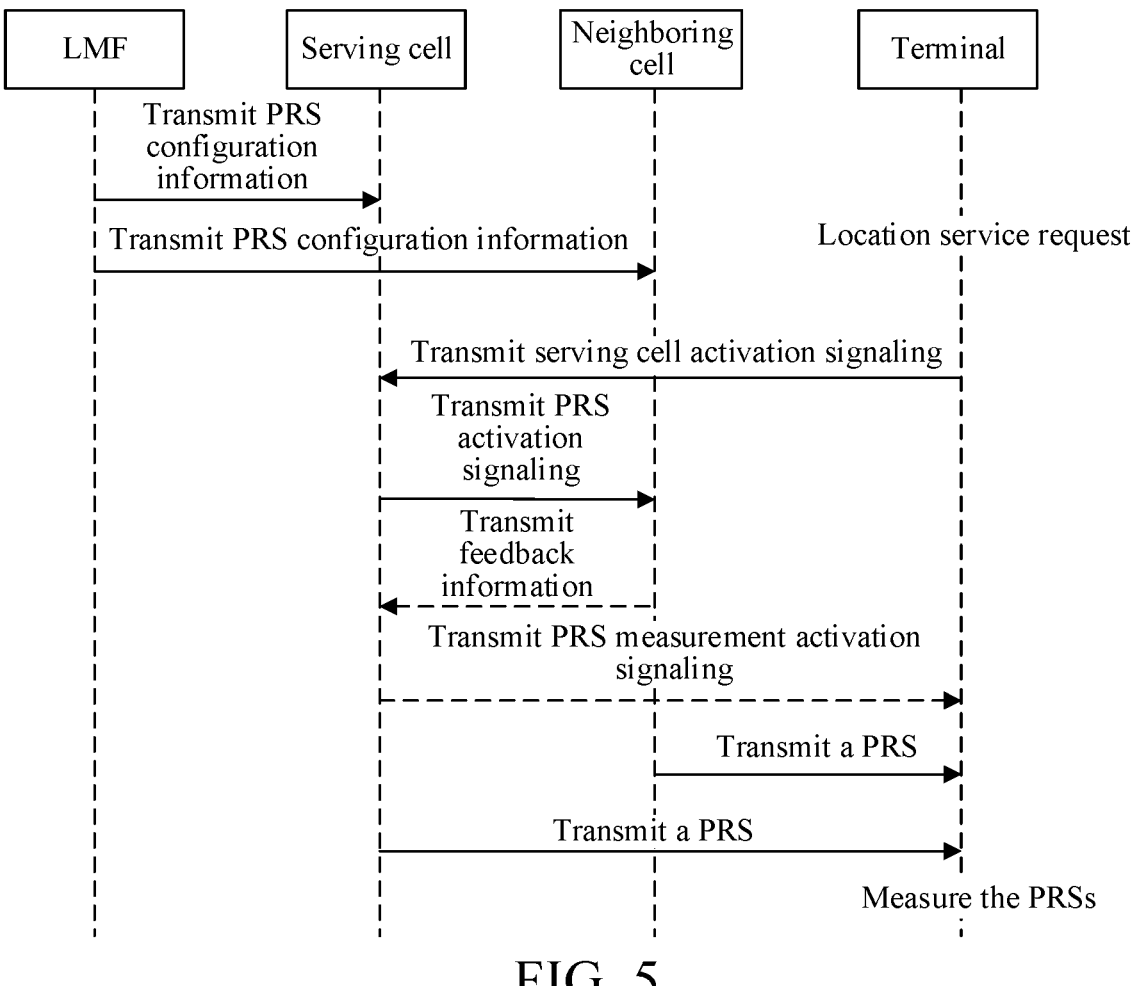
FIG. 5 is a schematic flowchart of a scenario 2.

Scenario 2. As shown in FIG. 5, a terminal performs a location service request, to request positioning that needs a low delay and high precision. Herein, an LMF configures PRS configuration information, and transmits the PRS configuration information to a serving cell and a neighboring cell for subsequent transmission of PRSs. The terminal transmits serving cell activation signaling (namely, first signaling) to the serving cell, to activate transmission of a PRS and PRS activation signaling (namely, second signaling) by the serving cell. The neighboring cell transmits a PRS based on the received PRS activation signaling. In this way, the terminal can measure the PRSs of the serving cell and the neighboring cell, so as to complete positioning.

The serving cell can also transmit PRS measurement activation signaling to the terminal, to notify the terminal to perform PRS measurement in time. The neighboring cell can also transmit feedback information to the serving cell after receiving the PRS activation signaling, to indicate an activation situation and other information.

The LMF can also include PRS configuration information of PRS activation signaling (namely, third signaling), to activate the transmission of the PRSs by the serving cell and the neighboring cell.

Figure 6:
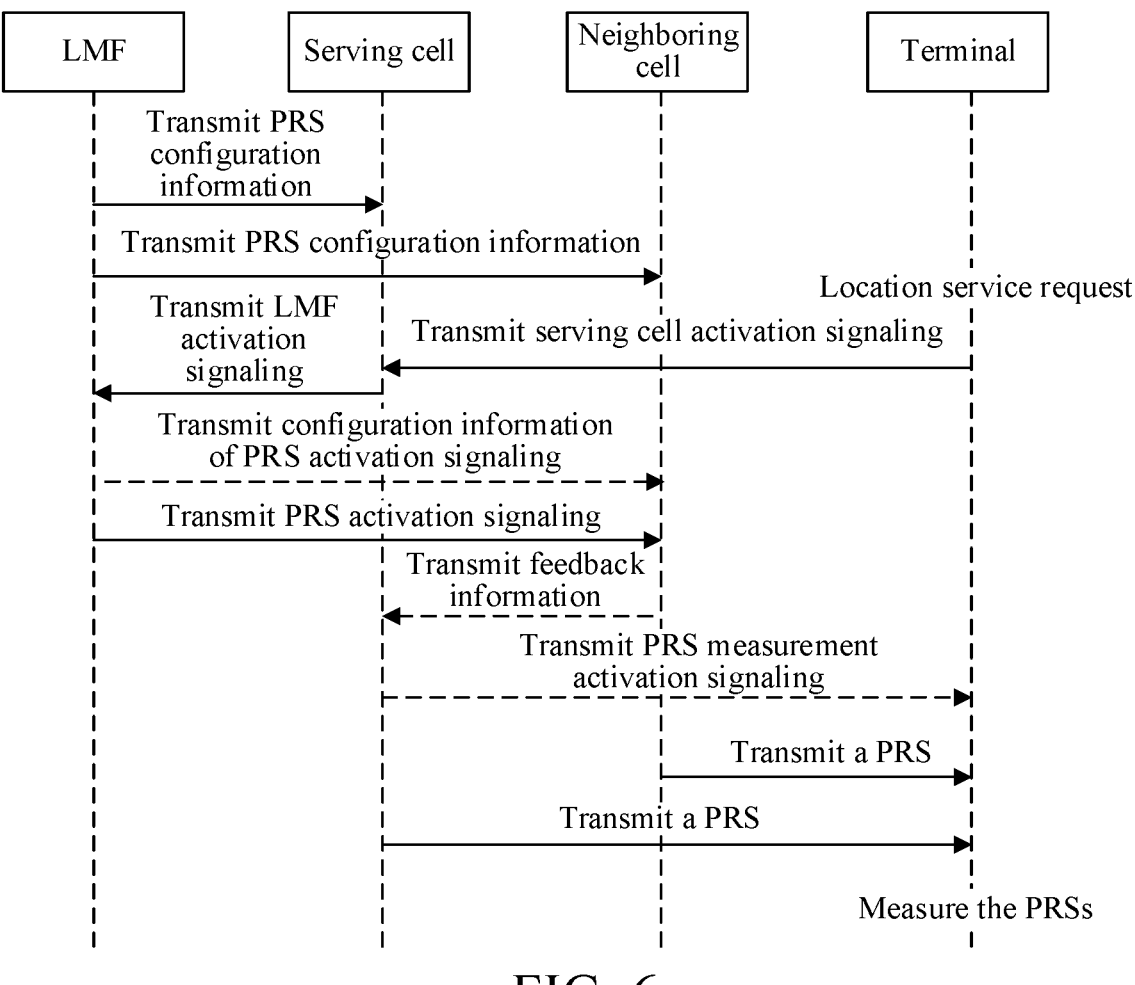
FIG. 6 is a schematic flowchart of a scenario 3.

Scenario 3. As shown in FIG. 6, a terminal performs a location service request, to request positioning that needs a low delay and high precision. Herein, an LMF configures PRS configuration information, and transmits the PRS configuration information to a serving cell and a neighboring cell for subsequent transmission of PRSs. The terminal transmits serving cell activation signaling (namely, first signaling) to the serving cell, to activate transmission of a PRS and LMF activation signaling (namely, second signaling) by the serving cell. The LMF transmits PRS activation signaling to the neighboring cell based on the received LMF activation signaling. The neighboring cell transmits a PRS based on the received PRS activation signaling. In this way, the terminal can measure the PRSs of the serving cell and the neighboring cell, so as to complete positioning.

The serving cell can also transmit PRS measurement activation signaling to the terminal, to notify the terminal to perform PRS measurement in time. The serving cell can also transmit configuration information of PRS activation signaling, so that the neighboring cell receives the PRS activation signaling. The neighboring cell can also transmit feedback information to the serving cell after receiving the PRS activation signaling, to indicate an activation situation and other information.

The LMF can also include PRS configuration information of PRS activation signaling (namely, third signaling), to activate the transmission of the PRSs by the serving cell and the neighboring cell.

Scenario 4. A terminal performs a location service request, to request positioning that needs a low delay and high precision. The terminal transmits serving cell activation signaling (namely, first signaling) to the serving cell, to activate transmission of a PRS and LMF activation signaling (namely, second signaling) by the serving cell. An LMF transmits PRS activation signaling to the neighboring cell based on the received LMF activation signaling. The neighboring cell transmits a PRS based on the received PRS activation signaling. In this way, the terminal can measure the PRSs of the serving cell and the neighboring cell, so as to complete positioning.

Scenario 5. A location server (Location Based Services, LBS) transmits a location request including a delay and a precision threshold to an LMF. Herein, the LMF configures PRS configuration information, and transmits the PRS configuration information to a serving cell and a neighboring cell for subsequent transmission of PRSs. The LMF may also transmit PRS configuration information to a terminal, for the terminal to subsequently measure the PRSs. The LMF transmits PRS configuration information of PRS activation signaling (namely, third signaling), to activate transmission of PRSs by the serving cell and the neighboring cell. The LMF or the serving cell transmits second signaling to activate transmission of a positioning reference signal by the neighboring cell or activate receiving of the positioning reference signal by a UE.

In addition, the serving cell may transmit PRS activation signaling to the neighboring cell to activate transmission of a PRS by the neighboring cell when transmitting LMF activation signaling to the LMF.

In the above scenario, the configuration information may be interactively configured by devices of two sides, for example, the PRS configuration information may be configured by the serving cell to be transmitted to the LMF.

In summary, in the method in this embodiment of this application, a terminal transmits first signaling to a target cell, namely, a serving cell and/or a neighboring cell of the terminal, to directly activate or deactivate transmission of a positioning-related signal by the target cell, so as to reduce delays of positioning, thereby meeting the timeliness requirement for obtaining a positioning reference signal.

As shown in FIG. 7, a positioning processing method in this embodiment of this application is applied to a network-side device, and includes the following steps.

Step 701. Receive first signaling of a terminal or third signaling of a location management device, where the first signaling and the third signaling are used for activating or deactivating transmission of a positioning-related signal by a target cell of the terminal; and the target cell includes a serving cell and/or a neighboring cell of the terminal.

In this way, the network-side device receives the first signaling of the terminal or the third signaling of the location management device, to directly activate or deactivate the transmission of the positioning-related signal, so as to reduce delays of positioning, thereby meeting the timeliness requirement for obtaining a positioning reference signal.

Herein, the network-side device is a base station of the serving cell and/or the neighboring cell of the terminal.

Optionally, the positioning-related signal includes at least one of the following:

second signaling, where the second signaling is used for activating or deactivating transmission of a positioning reference signal by the neighboring cell, or activating or deactivating receiving of the positioning reference signal by the terminal; or a positioning reference signal.

Optionally, the second signaling includes at least one of the following:

a target signal whose signal feature meets a first preset condition;

Xn interface information;

DCI;

a target downlink resource; or

LPPa or NRPPa information.

Optionally, the positioning reference signal includes at least one of the following:

an on demand PRS;

an aperiodic PRS;

a periodic PRS;

a CRS;

a CSI-RS;

an SSB; or a TRS.

Optionally, the method further includes:

transmitting the positioning-related signal; and before the transmitting the positioning-related signal, further including performing at least one of the following:

determining a to-be-transmitted positioning-related signal;

determining a to-be-transmitted positioning reference signal; or determining to-be-transmitted second signaling.

Optionally, the determining a to-be-transmitted positioning reference signal includes determining at least one of the following:

an identifier ID or group ID of the positioning reference signal;

a transmission time of the positioning reference signal;

a transmission period of the positioning reference signal;

a quantity of transmission times of the positioning reference signal;

a time frequency resource of the positioning reference signal;

a quantity of the positioning reference signal;

a spatial relation of the positioning reference signal;

power information of the positioning reference signal; or transmitting or stopping transmitting the positioning reference signal.

Optionally, the to-be-transmitted positioning reference signal is determined according to at least one of the following:

pre-configured configuration information of the positioning reference signal;

pre-defined configuration information of the positioning reference signal;

dynamically scheduled configuration information of the positioning reference signal; or the first signaling.

Optionally, after the receiving first signaling of a terminal or third signaling of a location management device, the method further includes:

transmitting the second signaling to the neighboring cell.

Optionally, the first signaling includes at least one of the following:

a physical random access channel PRACH signal;

a sounding reference signal SRS;

uplink control information UCI;

a target signal whose signal feature meets a second preset condition; or a first target uplink resource.

Optionally, the PRACH signal meets at least one of the following:

the PRACH signal includes one or more PRACH signals;

a preamble sequence of the PRACH signal is preset;

a transmission resource of the PRACH signal is preset;

there is a correspondence between the PRACH signal and the positioning-related signal;

the PRACH signal is a PRACH signal of the target cell;

the PRACH signal is determined according to monitoring the target cell and/or configuration of the target cell;

there is a correspondence between configuration information of the PRACH signal and the positioning-related signal; or there is a correspondence between a transmission resource of the PRACH signal and the positioning-related signal.

Optionally, the SRS meets at least one of the following:

a base sequence of the SRS is generated according to a preset identifier, where the preset identifier includes a cell ID, a public ID, or a positioning ID;

a sequence of the SRS is preset;

the SRS has at least one symbol for activating or deactivating the transmission of the positioning-related signal;

the SRS carries indication information for activating or deactivating;

there is a correspondence between the SRS and the positioning-related signal;

a transmission resource of the SRS is preset or dynamically scheduled;

configuration information of the SRS is preset or dynamically scheduled;

there is a correspondence between configuration information of the SRS signal and the positioning-related signal; or there is a correspondence between a transmission resource of the SRS and the positioning-related signal.

Optionally, the UCI meets at least one of the following:

the UCI carries indication information for activating or deactivating;

the UCI carries configuration information of the positioning-related signal; or a signaling format of the UCI is related to carried information.

Optionally, the target signal meets at least one of the following:

the target signal is a pseudorandom code sequence;

the target signal is a ZC sequence;

an initial seed of the target signal is associated with preset information;

there is a correspondence between the target signal and the positioning-related signal;

a transmission resource of the target signal is preset or dynamically scheduled;

a transmission resource of the target signal belongs to a target resource set;

sequence information or cyclic shifting of the target signal is associated with preset information;

configuration information of the target signal is preset or dynamically scheduled;

there is a correspondence between configuration information of the target signal and the positioning-related signal; or there is a correspondence between a transmission resource of the target signal and the positioning-related signal.

Optionally, the preset information includes at least one of the following:

a cell ID or group ID;

an ID of the target signal;

an ID or group ID of the positioning-related signal;

a symbol of the target signal;

a slot of the target signal;

a symbol of the positioning-related signal; or a slot of the positioning-related signal.

Optionally, the target resource set includes at least one of the following:

a resource set pre-configured by a network-side device;

a resource set pre-defined by a protocol;

a resource set capable of being preempted by the target signal; or a dynamically scheduled resource set.

Optionally, the target resource set meets at least one of the following:

a bandwidth of the target resource is fixed or corresponds to a bandwidth part BWP;

a center frequency of the target resource is fixed or corresponds to a BWP;

a comb structure Comb of the target resource is fixed or meets a third preset condition;

a frequency domain offset of the target resource is fixed or meets a fourth preset condition; or a time domain location of the target resource is fixed or corresponds to a candidate resource.

Optionally, the first target uplink resource meets at least one of the following:

the first target uplink resource carries configuration information of the positioning-related signal;

information carried by the first target uplink resource is capable of being parsed by a physical layer;

there is a correspondence between configuration information of the first target uplink resource and the positioning-related signal;

there is a correspondence between a transmission resource of the first target uplink resource and the positioning-related signal; or there is a correspondence between the first target uplink resource and a transmission time of the positioning-related signal.

Optionally, the third signaling includes:

NRPPa information.

Optionally, the method further includes:

receiving configuration information of the positioning-related signal through a second target uplink resource; or receiving the configuration information of the positioning-related signal transmitted by the location management device.

Optionally, the method further includes:

receiving configuration information of the first signaling transmitted by the location management device; or transmitting the configuration information of the first signaling, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Optionally, the method further includes:

receiving configuration information of the third signaling transmitted by the location management device; or transmitting the configuration information of the third signaling, where the configuration information of the third signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the third signaling; or a correspondence with the positioning-related signal.

Optionally, after the receiving first signaling of a terminal or third signaling of a location management device, the method further includes:

transmitting second feedback information, where the second feedback information is used for indicating at least one of the following:

whether the transmission of the positioning-related signal is successfully activated or deactivated;

whether the first signaling is successfully received; or whether the third signaling is successfully received.

Optionally, the target cell is determined in at least one of the following manners:

configuration of a network side;

a monitoring result of the terminal; or a measurement result of radio resource management RRM.

It should be noted that, the method applied to a network-side device in this embodiment cooperates with the above method applied to a terminal to complete positioning processing, and the implementations of the embodiments of the above method applied to a terminal are applicable to the method, and can also achieve the same technical effects.

As shown in FIG. 8, a positioning processing method in this embodiment of this application is applied to a location management device, and includes the following steps.

Step 801. Transmit third signaling to a target cell, where the third signaling is used for activating or deactivating transmission of a positioning-related signal by the target cell of a terminal; and the target cell includes a serving cell and/or a neighboring cell of the terminal.

The location management device transmits the third signaling to the target cell, namely, the serving cell and/or the neighboring cell of the terminal, to directly activate or deactivate the transmission of the positioning-related signal by the target cell, so as to reduce delays of positioning, thereby meeting the timeliness requirement for obtaining a positioning reference signal.

The location management device is, for example, an LMF, which is an LMF sinking to the serving cell.

Optionally, the positioning-related signal includes at least one of the following:

second signaling, where the second signaling is used for activating or deactivating transmission of a positioning reference signal by the neighboring cell, or activating or deactivating receiving of the positioning reference signal by the terminal; or a positioning reference signal.

Optionally, the second signaling includes at least one of the following:

a target signal whose signal feature meets a first preset condition;

an Xn interface signal;

DCI;

a target downlink resource; or

LPPa or NRPPa information.

Optionally, the positioning reference signal includes at least one of the following:

an on demand PRS;

an aperiodic PRS;

a periodic PRS;

a CRS;

a CSI-RS;

an SSB; or a TRS.

Optionally, the third signaling includes:

NRPPa information.

Optionally, the method further includes:

transmitting configuration information of the positioning-related signal.

Optionally, the method further includes:

transmitting configuration information of the first signaling, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Optionally, the method further includes:

receiving configuration information of the third signaling, where the configuration information of the third signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the third signaling; or a correspondence with the positioning-related signal.

Optionally, after the transmitting third signaling to a target cell, the method further includes:

receiving third feedback information, where the third feedback information is used for indicating at least one of the following:

whether the transmission of the positioning-related signal is successfully activated or deactivated; or whether the third signaling is successfully received.

Optionally, the method further includes:

transmitting fourth signaling, where the fourth signaling is used for activating or deactivating receiving of the positioning reference signal by the terminal.

It should be noted that, the method applied to a location management device in this embodiment cooperates with the above method applied to a network-side device to complete positioning processing, and the implementations of the embodiments of the above method applied to a network-side device are applicable to the method, and can also achieve the same technical effects.

Figures 9, 10, 11, 12:
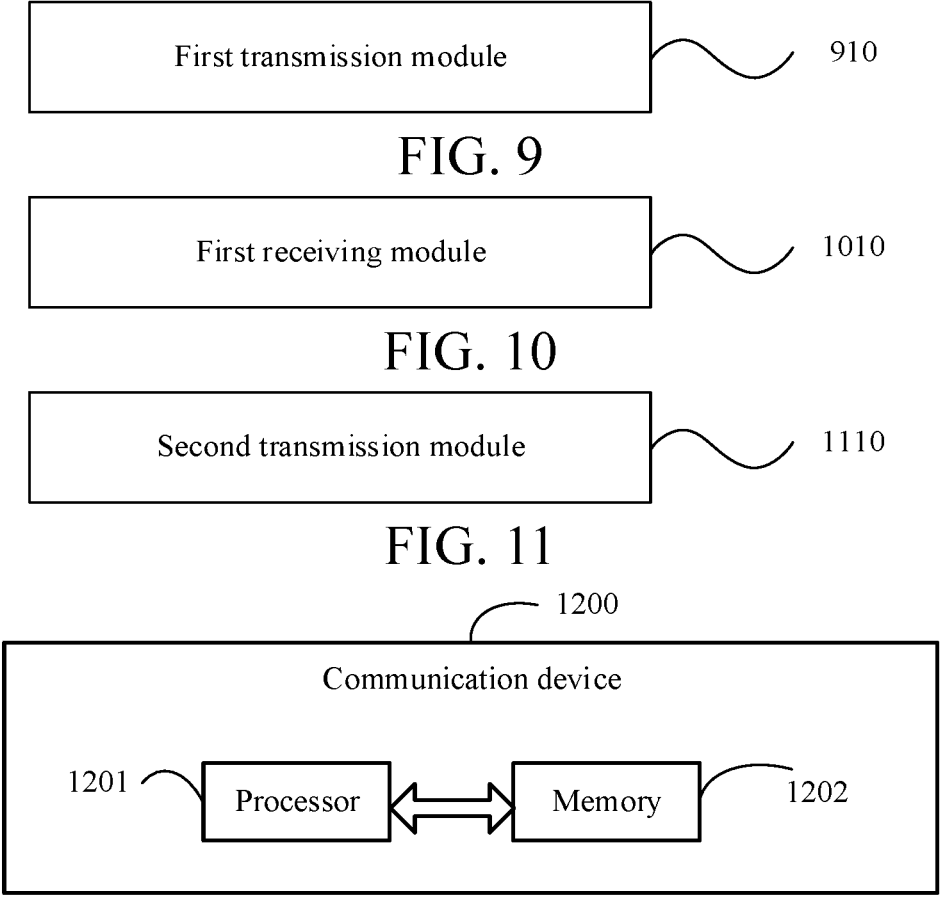
FIG. 9 is a schematic structural diagram of an apparatus corresponding to the method in FIG. 2.
FIG. 10 is a schematic structural diagram of an apparatus corresponding to the method in FIG. 7.
FIG. 11 is a schematic structural diagram of an apparatus corresponding to the method in FIG. 8.
FIG. 12 is a schematic structural diagram of a communication device according to an embodiment of this application.

As shown in FIG. 9, a positioning processing apparatus in an embodiment of this application includes:

a first transmission module 910, configured to transmit first signaling to a target cell, where the first signaling is used for activating or deactivating transmission of a positioning-related signal by the target cell of a terminal; and the target cell includes a serving cell and/or a neighboring cell of the terminal.

In this way, in this embodiment, the apparatus transmits the first signaling to the target cell, namely, the serving cell and/or the neighboring cell of the terminal, to directly activate or deactivate the transmission of the positioning-related signal by the target cell, so as to reduce delays of positioning, thereby meeting the timeliness requirement for obtaining a positioning reference signal.

Optionally, the positioning-related signal includes at least one of the following:

second signaling, where the second signaling is used for activating or deactivating transmission of a positioning reference signal by the neighboring cell, or activating or deactivating receiving of the positioning reference signal by the terminal; or a positioning reference signal.

Optionally, the second signaling includes at least one of the following:

a target signal whose signal feature meets a first preset condition;

Xn interface information;

DCI;

a target downlink resource; or

Long Term Evolution Positioning Protocol A LPPa or New Radio Positioning Protocol A NRPPa information.

Optionally, the positioning reference signal includes at least one of the following:

an on demand positioning reference signal PRS;

an aperiodic positioning reference signal PRS;

a periodic positioning reference signal PRS;

a cell reference signal CRS;

a channel state information reference signal CSI-RS;

a synchronization signal block SSB; or a tracking reference signal TRS.

Optionally, the positioning-related signal transmitted by the target cell includes at least one of the following:

determining a to-be-transmitted positioning-related signal;

determining a to-be-transmitted positioning reference signal; or determining to-be-transmitted second signaling.

Optionally, the determining a to-be-transmitted positioning reference signal includes determining at least one of the following:

an identifier ID or group ID of the positioning reference signal;

a transmission time of the positioning reference signal;

a transmission period of the positioning reference signal;

a quantity of transmission times of the positioning reference signal;

a time frequency resource of the positioning reference signal;

a quantity of the positioning reference signal;

a spatial relation of the positioning reference signal;

power information of the positioning reference signal; or transmitting or stopping transmitting the positioning reference signal.

Optionally, the to-be-transmitted positioning reference signal is determined according to at least one of the following:

pre-configured configuration information of the positioning reference signal;

pre-defined configuration information of the positioning reference signal;

dynamically scheduled configuration information of the positioning reference signal; or the first signaling.

Optionally, the first signaling includes at least one of the following:

a physical random access channel PRACH signal;

a sounding reference signal SRS;

uplink control information UCI;

a target signal whose signal feature meets a second preset condition; or a first target uplink resource.

Optionally, the PRACH signal meets at least one of the following:

the PRACH signal includes one or more PRACH signals;

a preamble sequence of the PRACH signal is preset;

a transmission resource of the PRACH signal is preset;

there is a correspondence between the PRACH signal and the positioning-related signal;

the PRACH signal is a PRACH signal of the target cell;

the PRACH signal is determined according to monitoring the target cell and/or configuration of the target cell;

there is a correspondence between configuration information of the PRACH signal and the positioning-related signal; or there is a correspondence between a transmission resource of the PRACH signal and the positioning-related signal. Optionally, the SRS meets at least one of the following:

a base sequence of the SRS is generated according to a preset identifier, where the preset identifier includes a cell ID, a public ID, or a positioning ID;

a sequence of the SRS is preset;

the SRS has at least one symbol for activating or deactivating the transmission of the positioning-related signal;

the SRS carries indication information for activating or deactivating;

there is a correspondence between the SRS and the positioning-related signal;

a transmission resource of the SRS is preset or dynamically scheduled;

there is a correspondence between a transmission resource of the SRS and the positioning-related signal;

configuration information of the SRS is preset or dynamically scheduled; or there is a correspondence between configuration information of the SRS and the positioning-related signal.

Optionally, the UCI meets at least one of the following:

the UCI carries indication information for activating or deactivating;

the UCI carries configuration information of the positioning-related signal; or a signaling format of the UCI is related to carried information.

Optionally, the target signal meets at least one of the following:

the target signal is a pseudorandom code sequence;

the target signal is a ZC sequence;

an initial seed Cinit of the target signal is associated with preset information;

there is a correspondence between the target signal and the positioning-related a transmission resource of the target signal is preset or dynamically scheduled;

a transmission resource of the target signal belongs to a target resource set;

sequence information or cyclic shifting of the target signal is associated with preset information;

configuration information of the target signal is preset or dynamically scheduled;

there is a correspondence between configuration information of the target signal and the positioning-related signal; or there is a correspondence between a transmission resource of the target signal and the positioning-related signal.

Optionally, the preset information includes at least one of the following:

a cell ID or group ID;

an ID of the target signal;

an ID or group ID of the positioning-related signal;

a symbol of the target signal;

a slot of the target signal;

a symbol of the positioning-related signal; or a slot of the positioning-related signal.

Optionally, the target resource set includes at least one of the following:

a resource set pre-configured by a network-side device;

a resource set pre-defined by a protocol;

a resource set capable of being preempted by the target signal; or a dynamically scheduled resource set.

Optionally, the target resource set meets at least one of the following:

a bandwidth of the target resource is fixed or corresponds to a bandwidth part BWP;

a center frequency of the target resource is fixed or corresponds to a BWP;

a comb structure Comb of the target resource is fixed or meets a third preset condition;

a frequency domain offset of the target resource is fixed or meets a fourth preset condition; or a time domain location of the target resource is fixed or corresponds to a candidate resource.

Optionally, the first target uplink resource meets at least one of the following:

the first target uplink resource carries configuration information of the positioning-related signal;

information carried by the first target uplink resource is capable of being parsed by a physical layer;

there is a correspondence between configuration information of the first target uplink resource and the positioning-related signal;

there is a correspondence between a transmission resource of the first target uplink resource and the positioning-related signal; or there is a correspondence between the first target uplink resource and a transmission time of the positioning-related signal.

Optionally, the apparatus further includes:

a first configuration information transmission module, configured to transmit configuration information of the positioning-related signal through a second target uplink resource.

Optionally, the apparatus further includes:

a first configuration information receiving module, configured to receive configuration information of the first signaling transmitted by a location management device or a network-side device, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Optionally, the apparatus further includes:

a first feedback information receiving module, configured to receive first feedback information of the target cell, where the first feedback information is used for indicating at least one of the following:
whether the transmission of the positioning-related signal is successfully activated or deactivated; or
whether the first signaling is successfully received.
Optionally, the target cell is determined in at least one of the following manners:
configuration of a network side;
a monitoring result of the terminal; or
a measurement result of radio resource management RRM.
It should be noted that, the apparatus of this embodiment applies the above method applied to a terminal, and the implementations of the embodiments of the above method applied to a terminal are applicable to the apparatus, and can also achieve the same technical effects.
As shown in FIG. 10, a positioning processing apparatus in an embodiment of this application includes:
a first receiving module 1010, configured to receive first signaling of a terminal or third signaling of a location management device, where
the first signaling and the third signaling are used for activating or deactivating transmission of a positioning-related signal by a target cell of the terminal; and
the target cell includes a serving cell and/or a neighboring cell of the terminal.
In this way, the network-side device receives the first signaling of the terminal or the third signaling of the location management device, to directly activate or deactivate the transmission of the positioning-related signal, so as to reduce delays of positioning, thereby meeting the timeliness requirement for obtaining a positioning reference signal.
Herein, the network-side device is a base station of the serving cell and/or the neighboring cell of the terminal.
Optionally, the positioning-related signal includes at least one of the following:
second signaling, where the second signaling is used for activating or deactivating transmission of a positioning reference signal by the neighboring cell, or activating or deactivating receiving of the positioning reference signal by the terminal; or
a positioning reference signal.
Optionally, the second signaling includes at least one of the following:
a target signal whose signal feature meets a first preset condition;
Xn interface information;
DCI;
a target downlink resource; or
LPPa or NRPPa information.
Optionally, the positioning reference signal includes at least one of the following:
an on demand PRS;
an aperiodic PRS;
a periodic PRS;
a CRS;
a CSI-RS;
an SSB; or
a TRS.
Optionally, the apparatus further includes:
a positioning-related signal transmission module, configured to transmit the positioning-related signal; and
a determining module, configured to perform at least one of the following:

determining a to-be-transmitted positioning-related signal;
determining a to-be-transmitted positioning reference signal; or
determining to-be-transmitted second signaling.
Optionally, the determining a to-be-transmitted positioning reference signal includes determining at least one of the following:
an identifier ID or group ID of the positioning reference signal;
a transmission time of the positioning reference signal;
a transmission period of the positioning reference signal;
a quantity of transmission times of the positioning reference signal;
a time frequency resource of the positioning reference signal;
a quantity of the positioning reference signal;
a spatial relation of the positioning reference signal;
power information of the positioning reference signal; or
transmitting or stopping transmitting the positioning reference signal.
Optionally, the to-be-transmitted positioning reference signal is determined according to at least one of the following:
pre-configured configuration information of the positioning reference signal;
pre-defined configuration information of the positioning reference signal;
dynamically scheduled configuration information of the positioning reference signal; or
the first signaling.
Optionally, the apparatus further includes:
a second signaling transmission module, configured to transmit the second signaling to the neighboring cell.
Optionally, the first signaling includes at least one of the following:
a physical random access channel PRACH signal;
a sounding reference signal SRS;
uplink control information UCI;
a target signal whose signal feature meets a second preset condition; or
a first target uplink resource.
Optionally, the PRACH signal meets at least one of the following:
the PRACH signal includes one or more PRACH signals;
a preamble sequence of the PRACH signal is preset;
a transmission resource of the PRACH signal is preset;
there is a correspondence between the PRACH signal and the positioning-related signal;
the PRACH signal is a PRACH signal of the target cell;
the PRACH signal is determined according to monitoring the target cell and/or configuration of the target cell;
there is a correspondence between configuration information of the PRACH signal and the positioning-related signal; or
there is a correspondence between a transmission resource of the PRACH signal and the positioning-related signal.
Optionally, the SRS meets at least one of the following:
a base sequence of the SRS is generated according to a preset identifier, where the preset identifier includes a cell ID, a public ID, or a positioning ID;
a sequence of the SRS is preset;
the SRS has at least one symbol for activating or deactivating the transmission of the positioning-related signal;

the SRS carries indication information for activating or deactivating;

there is a correspondence between the SRS and the positioning-related signal;

a transmission resource of the SRS is preset or dynamically scheduled;

configuration information of the SRS is preset or dynamically scheduled;

there is a correspondence between configuration information of the SRS signal and the positioning-related signal; or there is a correspondence between a transmission resource of the SRS and the positioning-related signal.

Optionally, the UCI meets at least one of the following:

the UCI carries indication information for activating or deactivating;

the UCI carries configuration information of the positioning-related signal; or a signaling format of the UCI is related to carried information.

Optionally, the target signal meets at least one of the following:

the target signal is a pseudorandom code sequence;

the target signal is a ZC sequence;

an initial seed of the target signal is associated with preset information;

there is a correspondence between the target signal and the positioning-related signal;

a transmission resource of the target signal is preset or dynamically scheduled;

a transmission resource of the target signal belongs to a target resource set;

sequence information or cyclic shifting of the target signal is associated with preset information;

configuration information of the target signal is preset or dynamically scheduled;

there is a correspondence between configuration information of the target signal and the positioning-related signal; or there is a correspondence between a transmission resource of the target signal and the positioning-related signal.

Optionally, the preset information includes at least one of the following:

a cell ID or group ID;

an ID of the target signal;

an ID or group ID of the positioning-related signal;

a symbol of the target signal;

a slot of the target signal;

a symbol of the positioning-related signal; or a slot of the positioning-related signal.

Optionally, the target resource set includes at least one of the following:

a resource set pre-configured by a network-side device;

a resource set pre-defined by a protocol;

a resource set capable of being preempted by the target signal; or a dynamically scheduled resource set.

Optionally, the target resource set meets at least one of the following:

a bandwidth of the target resource is fixed or corresponds to a bandwidth part BWP;

a center frequency of the target resource is fixed or corresponds to a BWP;

a comb structure Comb of the target resource is fixed or meets a third preset condition;

a frequency domain offset of the target resource is fixed or meets a fourth preset condition; or

a time domain location of the target resource is fixed or corresponds to a candidate resource.

Optionally, the first target uplink resource meets at least one of the following:

the first target uplink resource carries configuration information of the positioning-related signal;

information carried by the first target uplink resource is capable of being parsed by a physical layer;

there is a correspondence between configuration information of the first target uplink resource and the positioning-related signal;

there is a correspondence between a transmission resource of the first target uplink resource and the positioning-related signal; or there is a correspondence between the first target uplink resource and a transmission time of the positioning-related signal.

Optionally, the third signaling includes:

NRPPa information.

Optionally, the apparatus further includes:

a first configuration information transceiver module, configured to receive configuration information of the positioning-related signal through a second target uplink resource; or receive the configuration information of the positioning-related signal transmitted by the location management device.

Optionally, the apparatus further includes:

a second configuration information transceiver module, configured to receive configuration information of the first signaling transmitted by the location management device; or transmit the configuration information of the first signaling, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Optionally, the apparatus further includes:

a third configuration information transceiver module, configured to receive configuration information of the third signaling transmitted by the location management device; or transmit the configuration information of the third signaling, where the configuration information of the third signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the third signaling; or a correspondence with the positioning-related signal.

Optionally, the apparatus further includes:

a feedback transmission module, configured to transmit second feedback information, where the second feedback information is used for indicating at least one of the following:

whether the transmission of the positioning-related signal is successfully activated or deactivated;

whether the first signaling is successfully received; or whether the third signaling is successfully received.

Optionally, the target cell is determined in at least one of the following manners:

configuration of a network side;

a monitoring result of the terminal; or a measurement result of radio resource management RRM.

It should be noted that, the apparatus of this embodiment applies the above method applied to a network-side device, and the implementations of the embodiments of the above method applied to a network-side device are applicable to the apparatus, and can also achieve the same technical effects.

As shown in FIG. 11, a positioning processing apparatus in an embodiment of this application includes:

a second transmission module 1110, configured to transmit third signaling to a target cell, where the third signaling is used for activating or deactivating transmission of a positioning-related signal by the target cell of a terminal; and the target cell includes a serving cell and/or a neighboring cell of the terminal.

The location management device transmits the third signaling to the target cell, namely, the serving cell and/or the neighboring cell of the terminal, to directly activate or deactivate the transmission of the positioning-related signal by the target cell, so as to reduce delays of positioning, thereby meeting the timeliness requirement for obtaining a positioning reference signal.

The location management device is, for example, an LMF, which is an LMF sinking to the serving cell.

Optionally, the positioning-related signal includes at least one of the following:

second signaling, where the second signaling is used for activating or deactivating transmission of a positioning reference signal by the neighboring cell, or activating or deactivating receiving of the positioning reference signal by the terminal; or a positioning reference signal.

Optionally, the second signaling includes at least one of the following:

a target signal whose signal feature meets a first preset condition;

an Xn interface signal;

DCI;

a target downlink resource; or

LPPa or NRPPa information.

Optionally, the positioning reference signal includes at least one of the following:

an on demand PRS;

an aperiodic PRS;

a periodic PRS;

a CRS;

a CSI-RS;

an SSB; or a TRS.

Optionally, the third signaling includes:

an NRPPa signal.

Optionally, the apparatus further includes:

a second configuration information transmission module, configured to transmit configuration information of the positioning-related signal.

Optionally, the apparatus further includes:

a third configuration information transmission module, configured to transmit configuration information of the first signaling, where the configuration information of the first signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the first signaling; or a correspondence with the positioning-related signal.

Optionally, the apparatus further includes:

a second configuration information receiving module, configured to receive configuration information of the third signaling, where the configuration information of the third signaling includes at least one of the following:

a type of the signaling;

an identifier ID or group ID of the signal;

a transmission time of the signal;

a transmission period of the signal;

a quantity of transmission times of the signal;

a time domain resource of the signal;

a quantity of the signal;

a spatial relation of the signal;

power information of the signal;

transmitting or stopping transmitting the third signaling; or a correspondence with the positioning-related signal.

Optionally, the apparatus further includes:

a second feedback information receiving module, configured to receive third feedback information, where the third feedback information is used for indicating at least one of the following:

whether the transmission of the positioning-related signal is successfully activated or deactivated; or whether the third signaling is successfully received.

Optionally, the apparatus further includes:

a third transmission module, configured to transmit fourth signaling, where the fourth signaling is used for activating or deactivating receiving of the positioning reference signal by the terminal.

It should be noted that, the apparatus of this embodiment applies the above method applied to a location management device, and the implementations of the embodiments of the above method applied to a network-side device are applicable to the apparatus, and can also achieve the same technical effects.

It should be noted that, in a positioning processing method provided in the embodiments of this application, an execution entity may be a positioning processing apparatus, or a control module configured to execute and load the positioning processing method in the positioning processing apparatus. In this embodiment of this application, an example in which the positioning processing apparatus executes and loads the positioning processing method is used to describe the positioning processing method provided in the embodiments of this application.

The positioning processing apparatus in this embodiment of this application may be an apparatus, or may be a component, an integrated circuit, or a chip in a device. The apparatus may be a mobile electronic device or a non-mobile electronic device. Exemplarily, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, a personal digital assistant (personal digital assistant, PDA), or the like, and the non-mobile electronic device may be a server, a network attached memory (Network Attached Storage, NAS), a personal computer (personal computer, PC), a television (television, TV), a teller machine, a self-service machine, or the like. This is not specifically limited in this embodiment of this application.

The positioning processing apparatus in this embodiment of this application may be an apparatus having an operating system. The operating system may be an android (Android) operating system, may be an ios operating system, and may also be another possible operating system. This is not specifically limited in this embodiment of this application.

The positioning processing apparatus provided in this embodiment of this application can implement all processes implemented by corresponding devices in the method embodiments of FIG. 1 to FIG. 8. To avoid repetition, details are not described herein again.

Optionally, as shown in FIG. 12, an embodiment of this application further provides a communication device, including a processor 1201, a memory 1202, and a program or instruction stored on the memory 1202 and executable on the processor 1201. For example, when the communication device 1200 is a terminal, the program or instruction, when executed by the processor 1201, implements all processes of the embodiments of the above positioning processing method applied to a terminal, and can achieve the same technical effects. When he communication device 1200 is a network-side device, the program or instruction, when executed by the processor 1201, implements all processes of the embodiments of the above positioning processing method applied to a network-side device, and can achieve the same technical effects. When the communication device 1200 is a location management device, the program or instruction, when executed by the processor 1201, implements all processes of the embodiments of the above positioning processing method applied to a location management device, and can achieve the same technical effects. To avoid repetition, details are not described herein again.

Figure 13:
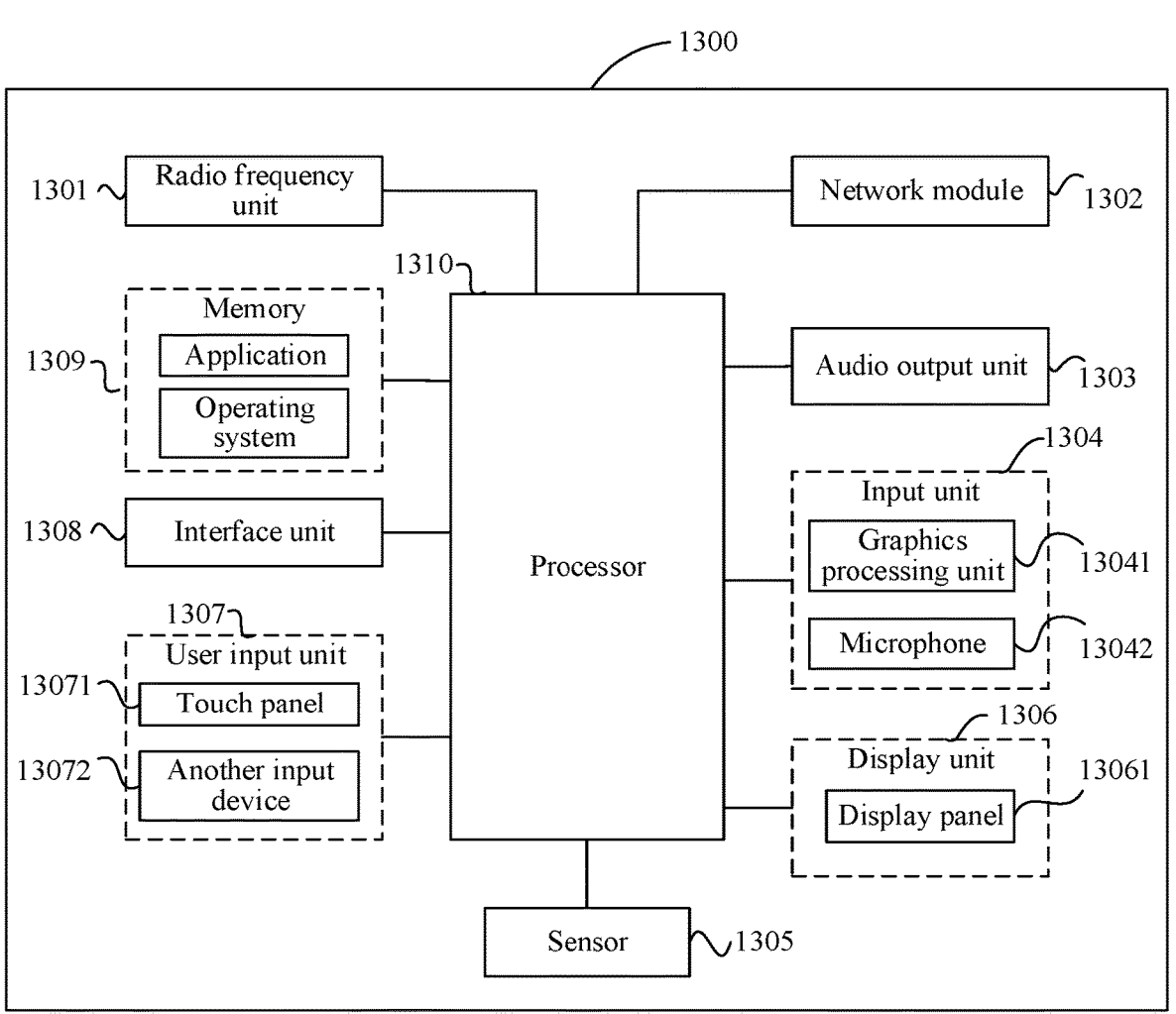
FIG. 13 is a schematic structural diagram of a terminal according to an embodiment of this application.

FIG. 13 is a schematic diagram of a hardware structure of a terminal that implements the embodiments of this application.

A terminal 1300 includes, but is not limited to, components such as a radio frequency unit 1301, a network module 1302, an audio output unit 1303, an input unit 1304, a sensor 1305, a display unit 1306, a user input unit 1307, an interface unit 1308, a memory 1309, and a processor 1310.

A person skilled in the art may understand that the terminal 1300 further includes a power supply (such as a battery) for supplying power to the components. The power supply may logically connect to the processor 1310 by using a power supply management system, thereby implementing functions, such as charging, discharging, and power consumption management, by using the power supply management system. A terminal structure shown in FIG. 13 does not constitute a limitation to the terminal, and the terminal may include more or fewer components than those shown in the figure, or some components may be combined, or a different component deployment may be used. Details are not described herein again.

It should be understood that, in this embodiment of this application, the input unit 1304 may include a graphics processing unit (GPU) 13041 and a microphone 13042. The graphics processing unit 13041 performs processing on image data of a static picture or a video that is obtained by an image acquisition apparatus (for example, a camera) in a video acquisition mode or an image acquisition mode. The display unit 1306 may include a display panel 13061, for example, the display panel 13061 may be configured in a form such as a liquid crystal display or an organic light-emitting diode. the user input unit 1307 includes a touch panel 13071 and another input device 13072. The touch panel 13071 is also referred to as a touch screen. The touch panel 13071 may include two parts: a touch detection apparatus and a touch controller. the another input device 13072 may include, but is not limited to, a physical keyboard, a functional key (for example, a volume control key or a switch key), a track ball, a mouse, and a joystick, and the details will not be described herein again.

In this embodiment of this application, the radio frequency unit 1301 receives downlink data from a network-side device and transmits downlink data to the processor 1310 for processing. In addition, the radio frequency unit transmits uplink data to the network-side device. Generally, the radio frequency unit 1301 includes, but is not limited to, an antenna, at least one amplifier, a transceiver, a coupler, a low noise amplifier, a duplexer, and the like.

The memory 1309 may be configured to store a software program or instruction and various data. The memory 1309 may mainly include a program or instruction storage region and a data storage region. The program or instruction storage region may store an operating system, an application program or instruction required by at least one function (for example, a sound playback function and an image playback function), or the like. The memory 1309 may include a high speed random access memory, and may also include a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. For example, the nonvolatile memory may be at least one magnetic disk storage device, a flash memory device, or other volatile solid-state storage devices.

The processor 1310 may include one or more processing units. Optionally, the processor 1310 may integrate an application processor and a modem. The application processor mainly processes an operating system, a user interface, an application program or instruction, and the like. The modem mainly processes wireless communication, such as a baseband processor. It may be understood that the foregoing modem may not be integrated into the processor 1310.

The frequency unit 1301 is configured to transmit first signaling to a target cell, where the first signaling is used for activating or deactivating transmission of a positioning-related signal by the target cell of the terminal; and the target cell includes a serving cell and/or a neighboring cell of the terminal.

The first signaling is transmitted to the target cell, namely, the serving cell and/or the neighboring cell of the terminal, to directly activate or deactivate the transmission of the positioning-related signal by the target cell, so as to reduce delays of positioning, thereby meeting the timeliness requirement for obtaining a positioning reference signal.

In this embodiment, a terminal transmits first signaling to a target cell, namely, a serving cell and/or a neighboring cell of the terminal, to directly activate or deactivate transmission of a positioning-related signal by the target cell, so as to reduce delays of positioning, thereby meeting the timeliness requirement for obtaining a positioning reference signal.

Figure 14:
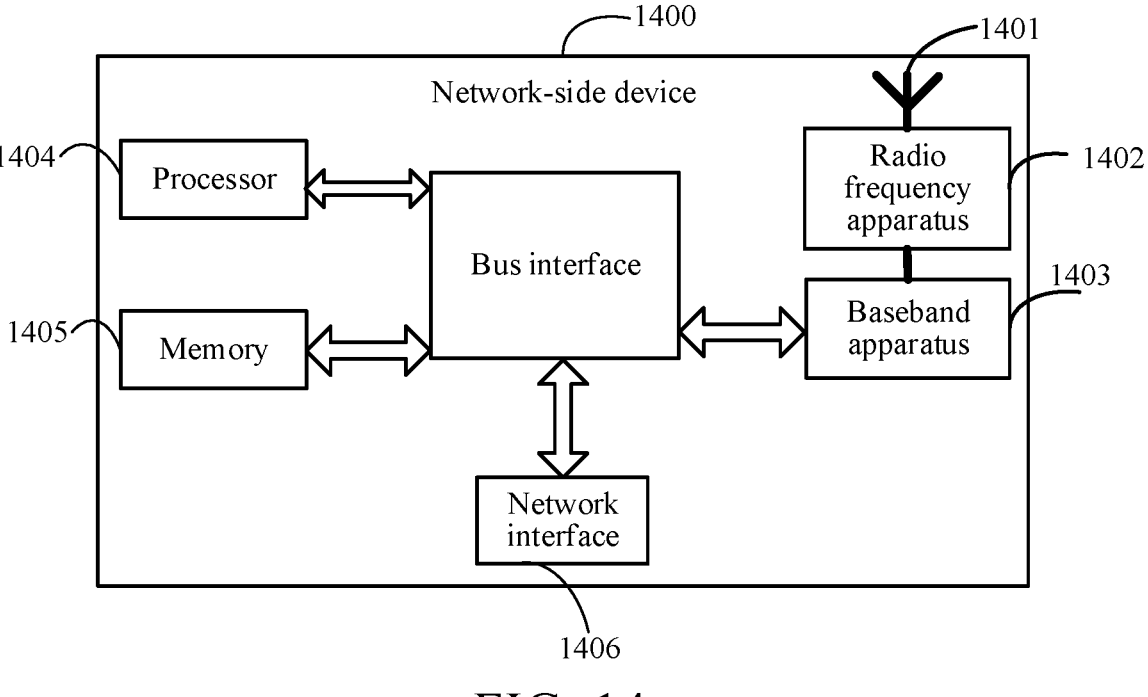
FIG. 14 is a schematic structural diagram of a network-side device according to an embodiment of this application.

Alternatively, an embodiment of this application further provides a network-side device. As shown in FIG. 14, the network device 1400 includes an antenna 1401, a radio frequency apparatus 1402, and a baseband apparatus 1403. The antenna 1401 is connected to the radio frequency apparatus 1402. In an uplink direction, the radio frequency apparatus 1402 receives information by using the antenna 1401, and transmits the received information to the baseband apparatus 1403 for processing. In a downlink direction, the baseband apparatus 1403 processes information that is to be transmitted, and transmits the information to the radio frequency apparatus 1402. The radio frequency apparatus 1402 processes the received information and transmits the information by using the antenna 1401.

A frequency band processing apparatus may be located in the baseband apparatus 1403, so that the method executed by the network-side device in the above embodiments can be implemented in the baseband apparatus 1403. The baseband apparatus 1403 includes a processor 1404 and a memory 1405.

The baseband apparatus 1403 may include, for example, at least one baseband plate. A plurality of chips are disposed on the baseband plate. As shown in FIG. 14, one of the plurality of chips is, for example, the processor 1404, and is connected to the memory 1405, to invoke a program in the memory 1405 to perform operations of the network device in the above method embodiments.

The baseband apparatus 1403 may further include a network interface 1406, configured to exchange information with the radio frequency apparatus 1402. The interface is, for example, a common public radio interface (CPRI).

Alternatively, the network-side device in this embodiment of the present invention further includes: an instruction or program stored in the memory 1405 and executable on the processor 1404, and the processor 1404 invokes the instruction or program stored in the memory 1405 to perform the method executed by various modules shown in FIG. 10, and can also achieve the same technical effects. To avoid repetition, details are not described herein again.

An embodiment of this application further provides a readable storage medium, storing a program or instruction. The program or instruction, when executed by a processor, implements all processes of the embodiments of the above positioning processing method applied to a terminal, or implements all processes of the embodiments of the above positioning processing method applied to a network-side device, or implements all processes of the embodiments of the above positioning processing method applied to a location management device, and can achieve the same technical effects. To avoid repetition, details are not described herein again.

The processor is the processor in the above electronic device in the foregoing embodiments. The readable storage medium includes a computer-readable storage medium, for example, a computer read-only memory (ROM), a random access memory (RAM), a magnetic disk, or an optical disc.

An embodiment of this application further provides a chip, including: a processor and a communication interface, where the communication interface is coupled to the processor, and the processor is configured to run a program or instruction, to implement all processes of the embodiments of the above positioning processing method applied to a terminal, or implement all processes of the embodiments of the above positioning processing method applied to a network-side device, or implement all processes of the embodiments of the above positioning processing method applied to a location management device, and can achieve the same technical effects. To avoid repetition, details are not described herein again.

It should be understood that, the chip mentioned in this embodiment of this application may also be referred to as a system-level chip, a system chip, a chip system, a system on chip, or the like.

It should be noted that, the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it should be noted that the scope of the methods and apparatuses in the implementations of this application is not limited to performing the functions in the order shown or discussed, but may also include performing, according to involved functions, the functions basically simultaneously or in a reverse order. For example, the described methods may be performed in an order different from that described, and various steps may also be added, omitted, or combined. In addition, features described with reference to some examples may be combined in other examples.

A person of ordinary skill in the art may notice that the exemplary units and algorithm steps described with reference to the embodiments disclosed in this specification can be implemented in electronic hardware, or a combination of computer software and electronic hardware. Whether the functions are executed by hardware or software depends on particular applications and design constraint conditions of the technical solutions. Those skilled in the art may use different methods to implement the described functions for each particular application, but such implementation is not to be considered beyond the scope of the present disclosure.

Persons skilled in the art can clearly understand that for convenience and conciseness of description, for specific working processes of the foregoing described system, apparatus and unit, reference may be made to the corresponding processes in the foregoing method embodiments, and details are not described herein.

In the embodiments provided in this application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separate, and components displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of the present disclosure may be integrated into one processing unit, or each of the units may exist physically separated, or two or more units are integrated into one unit.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the existing technologies may be implemented in the form of a software product. The computer software product is stored in a storage medium (for example, a read-only memory (ROM)/random access memory (RAM), a magnetic disk or an optical disc), and includes several instructions for instructing a terminal (which may be a mobile phone, a computer, a server, an air conditioner, a network device, or the like) to perform the method described in the embodiments of this application.

It may be understood that, the embodiments described in the embodiments of the present disclosure may be implemented by using software, hardware, firmware, middleware, microcode, or a combination thereof. For implementation by hardware, modules, units, and subunits may be implemented in one or more application-specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in the present disclosure, or a combination of the above.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented in the processor or outside the processor.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. A positioning processing method performed by a network-side device, comprising:

receiving configuration information of first signaling transmitted by a location management device; and receiving the first signaling of the location management device, wherein the first signaling is used for activating or deactivating transmission of a positioning-related signal by a target cell of a terminal; and the target cell comprises a neighboring cell of the terminal; wherein the method further comprises:

transmitting the positioning-related signal; wherein the configuration information of the first signaling at least comprises a correspondence with the positioning-related signal; wherein the correspondence with the positioning-related signal comprises: the first signaling activates or deactivates specific positioning-related signals.

2. The method according to claim 1, wherein the positioning-related signal comprises a positioning reference signal.

3. The method according to claim 2, wherein the positioning reference signal comprises an on demand PRS.

4. The method according to claim 1, before the transmitting the positioning-related signal, further comprising performing:

determining a to-be-transmitted positioning reference signal.

5. The method according to claim 4, wherein the determining a to-be-transmitted positioning reference signal comprises determining at least one of the following:

an identifier (ID) or group ID of the positioning reference signal;

a transmission time of the positioning reference signal;

a transmission period of the positioning reference signal;

a quantity of transmission times of the positioning reference signal;

a time frequency resource of the positioning reference signal;

a quantity of the positioning reference signal;

a spatial relation of the positioning reference signal;

power information of the positioning reference signal; or transmitting or stopping transmitting the positioning reference signal.

6. The method according to claim 1, wherein after the receiving the first signaling of the location management device, the method further comprises:

transmitting first feedback information, wherein the first feedback information is used for indicating whether the transmission of the positioning-related signal is successfully activated or deactivated.

7. The method according to claim 1, wherein the target cell further comprises a serving cell of the terminal.

8. A positioning processing method performed by a location management device, comprising:

transmitting first signaling to a target cell, wherein the first signaling is used for activating or deactivating transmission of a positioning-related signal by the target cell of a terminal; and the target cell comprises a neighboring cell of the terminal; wherein the method further comprises:

transmitting configuration information of the first signaling to a network-side device; wherein the configuration information of the first signaling at least comprises a correspondence with the positioning-related signal; wherein the correspondence with the positioning-related signal comprises: the first signaling activates or deactivates specific positioning-related signals.

9. The method according to claim 8, wherein the positioning-related signal comprises at least one of the following:

second signaling, wherein the second signaling is used for activating or deactivating transmission of a positioning reference signal by the neighboring cell, or activating or deactivating receiving of the positioning reference signal by the terminal; or a positioning reference signal.

10. The method according to claim 9, wherein the second signaling comprises Long Term Evolution Positioning Protocol A (LPPa) or New Radio Positioning Protocol A (NRPPa) information.

11. The method according to claim 9, wherein the positioning reference signal comprises an on demand PRS.

12. The method according to claim 8, wherein the method further comprises:

receiving configuration information of the first signaling, wherein the configuration information of the first signaling comprises at least one of the following:

an identifier (ID) or group ID of a signal;

a transmission period of the signal; or a spatial relation of the signal.

13. The method according to claim 8, wherein after the transmitting the first signaling to the target cell, the method further comprises:

receiving second feedback information, wherein the second feedback information is used for indicating at least one of the following:

whether the transmission of the positioning-related signal is successfully activated or deactivated; or whether the first signaling is successfully received.

14. A network-side device, comprising a processor, a memory, wherein a program or an instruction is stored in the memory and executable on the processor, and the program or the instruction, when executed by the processor, causes the network-side device to perform:

receiving configuration information of first signaling transmitted by a location management device; and receiving the first signaling of the location management device, wherein the first signaling is used for activating or deactivating transmission of a positioning-related signal by a target cell of a terminal; and the target cell comprises a neighboring cell of the terminal; wherein the program or the instruction, when executed by the processor, causes the network-side device to perform:

transmitting the positioning-related signal; wherein the configuration information of the first signaling at least comprises a correspondence with the positioning-related signal; wherein the correspondence with the positioning-related signal comprises: the first signaling activates or deactivates specific positioning-related signals.

15. The network-side device according to claim 14, wherein the positioning-related signal comprises a positioning reference signal.

16. The network-side device according to claim 15, wherein the positioning reference signal comprises an on demand PRS.

17. The network-side device according to claim 14, wherein the program or the instruction, when executed by the processor, causes the network-side device to further perform:

determining a to-be-transmitted positioning reference signal.

18. The network-side device according to claim 17, wherein the determining a to-be-transmitted positioning reference signal comprises determining at least one of the following:

an identifier (ID) or group ID of the positioning reference signal;

a transmission time of the positioning reference signal;

a transmission period of the positioning reference signal;

a quantity of transmission times of the positioning reference signal;

a time frequency resource of the positioning reference signal;

a quantity of the positioning reference signal;

a spatial relation of the positioning reference signal;

power information of the positioning reference signal; or transmitting or stopping transmitting the positioning reference signal.

19. The network-side device according to claim 14, wherein the program or the instruction, when executed by the processor, causes the network-side device to further perform:

transmitting first feedback information, wherein the first feedback information is used for indicating whether the transmission of the positioning-related signal is successfully activated or deactivated.

20. The network-side device according to claim 14, wherein the target cell further comprises a serving cell of the terminal.

* * * * *